United States Patent
Lovett et al.

(10) Patent No.: US 7,398,380 B1
(45) Date of Patent: Jul. 8, 2008

(54) DYNAMIC HARDWARE PARTITIONING OF SYMMETRIC MULTIPROCESSING SYSTEMS

(75) Inventors: Thomas Dean Lovett, Portland, OR (US); Daryl V. McDaniel, Portland, OR (US)

(73) Assignee: Fabric7 Systems, Inc., Mountain View, CA (US)

( * ) Notice: Subject to any disclaimer, the term of this patent is extended or adjusted under 35 U.S.C. 154(b) by 444 days.

(21) Appl. No.: 11/256,269

(22) Filed: Oct. 22, 2005

Related U.S. Application Data

(63) Continuation-in-part of application No. 11/057,120, filed on Feb. 12, 2005, and a continuation-in-part of application No. 11/057,048, filed on Feb. 12, 2005, and a continuation-in-part of application No. 11/057,117, filed on Feb. 12, 2005, and a continuation-in-part of application No. 11/057,035, filed on Feb. 12, 2005, and a continuation-in-part of application No. 11/057,112, filed on Feb. 12, 2005, and a continuation-in-part of application No. 11/057,119, filed on Feb. 12, 2005, and a continuation-in-part of application No. 11/057,036, filed on Feb. 12, 2005, and a continuation-in-part of application No. 11/057,037, filed on Feb. 12, 2005, and a continuation-in-part of application No. 11/057,116, filed on Feb. 12, 2005, and a continuation-in-part of application No. 10/889,469, filed on Jul. 12, 2004, and a continuation-in-part of application No. 10/889,467, filed on Jul. 12, 2004, and a continuation-in-part of application No. 10/889,468, filed on Jul. 12, 2004.

(60) Provisional application No. 60/690,763, filed on Jun. 14, 2005, provisional application No. 60/650,707, filed on Feb. 7, 2005, provisional application No. 60/651,026, filed on Feb. 7, 2005, provisional application No. 60/651,027, filed on Feb. 7, 2005, provisional application No. 60/603,250, filed on Aug. 20, 2004, provisional application No. 60/563,222, filed on Apr. 17, 2004, provisional application No. 60/544,916, filed on Feb. 13, 2004.

(51) Int. Cl.
*G06F 9/00* (2006.01)
*G06F 15/00* (2006.01)

(52) U.S. Cl. ............... 713/1; 713/100; 712/13; 712/15; 716/12; 716/16

(58) Field of Classification Search .............. 713/1, 713/100; 712/13, 15; 716/12, 16
See application file for complete search history.

(56) References Cited

U.S. PATENT DOCUMENTS

| | | | | |
|---|---|---|---|---|
| 5,574,914 | A * | 11/1996 | Hancock et al. | 712/220 |
| 6,519,660 | B1 * | 2/2003 | Rooney | 710/38 |
| 7,024,483 | B2 * | 4/2006 | Dinker et al. | 709/227 |
| 2003/0131067 | A1 * | 7/2003 | Downer et al. | 709/213 |
| 2003/0212884 | A1 * | 11/2003 | Lee et al. | 713/1 |

* cited by examiner

*Primary Examiner*—Mark Connolly
(74) *Attorney, Agent, or Firm*—PatentVentures; Bennett Smith; Korbin Van Dyke

(57) ABSTRACT

Dynamic hardware partitioning of symmetric multiprocessing systems enables on-the-fly provisioning of servers of varying performance characteristics by configuring physical partitions having selectable numbers of processors. Processors are directed to disable included coherency links (for example by de-asserting respective Power-Good indicators to each of the processors). Then processors selected for inclusion in a first physical partition are directed to form coherency links with all adjacent processors (for example by asserting the respective Power-Good indicators to each of the processors of the first physical partition). All other processors in the system remain isolated (i.e. their respective Power-Good indicators remain de-asserted). The processors of the first physical partition are then directed to fetch and execute instructions (for example by de-asserting respective Reset indicators to each of the processors). The processors of the first physical partition complete booting and then a second physical partition is formed in a manner similar to the first.

20 Claims, 10 Drawing Sheets

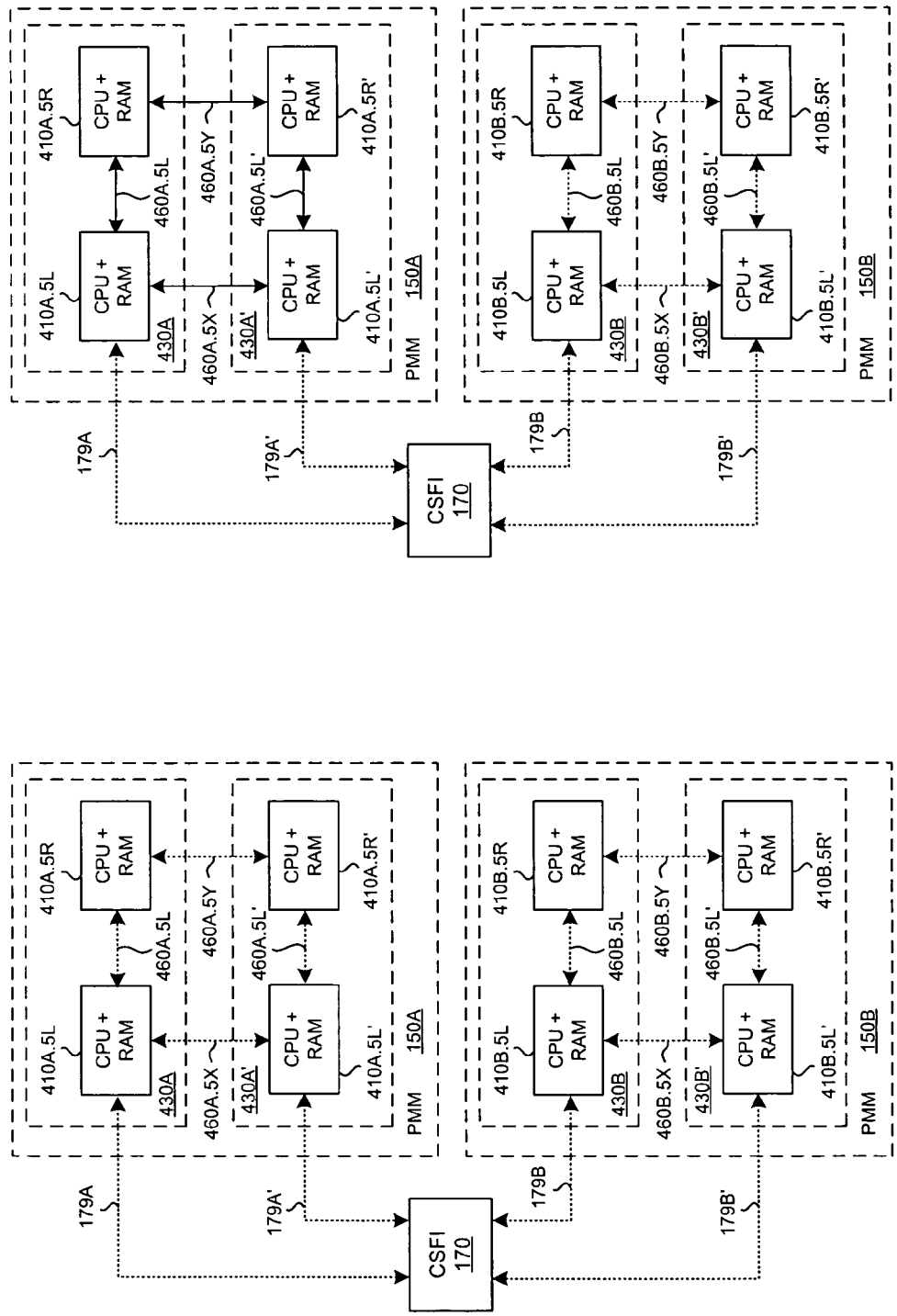

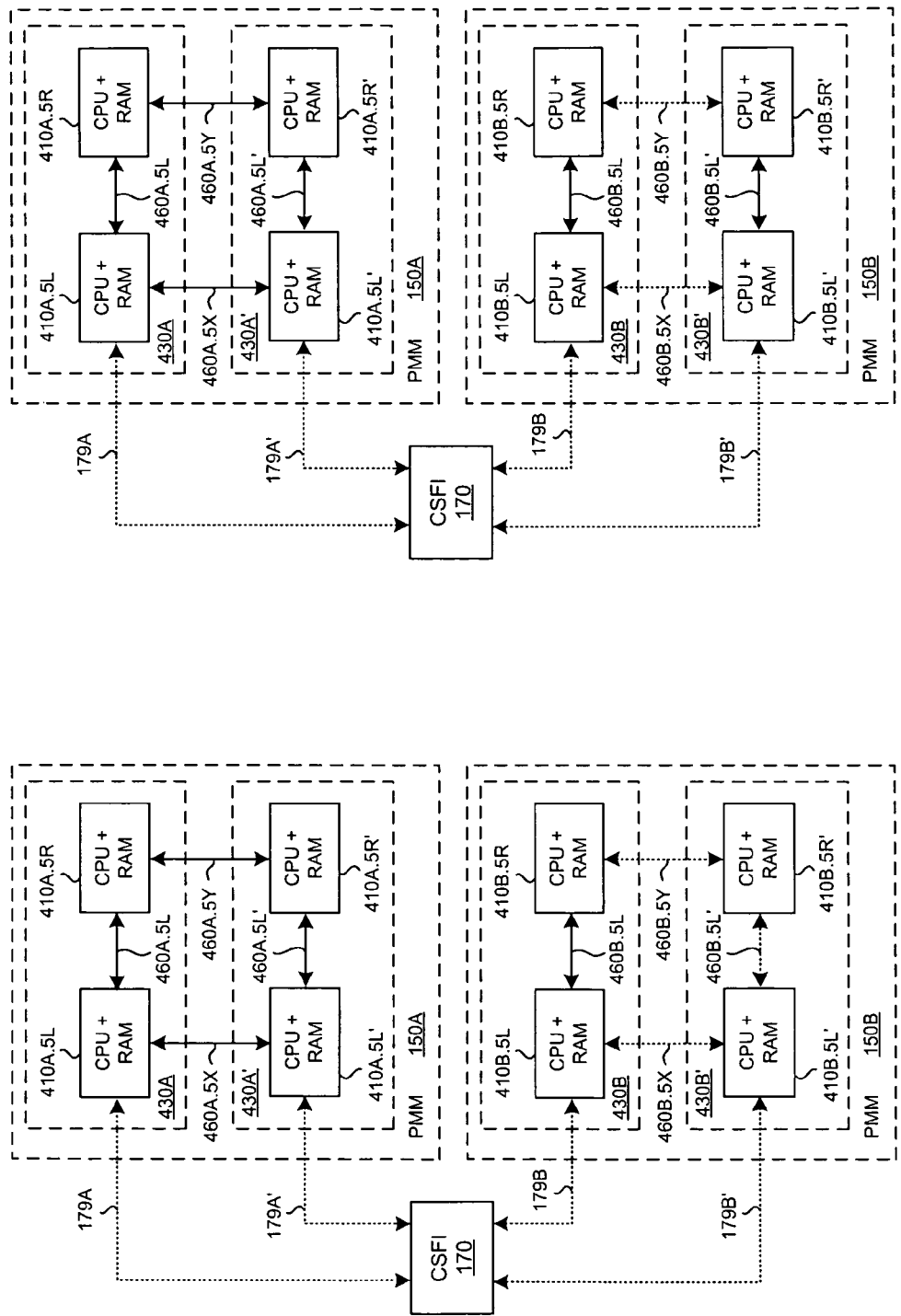

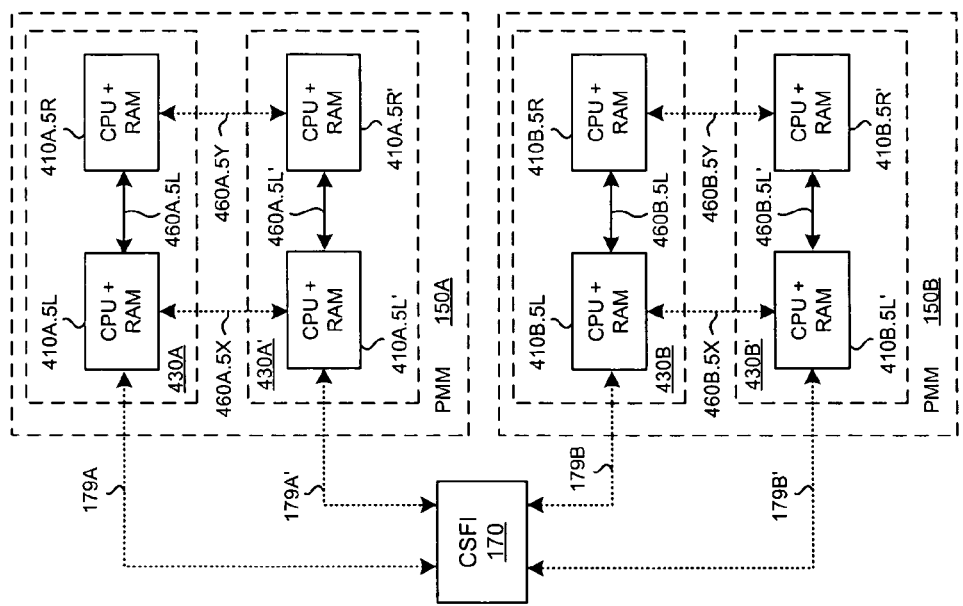

DYNAMIC HARDWARE PARTITIONING OF SYMMETRIC MULTIPROCESSING SYSTEMS

CROSS REFERENCE TO RELATED APPLICATIONS

Priority benefit claims for this application are made in the accompanying Application Data Sheet. This application incorporates by reference for all purposes the following applications, which are all owned by the owner of the instant application:

U.S. Provisional Application Ser. No. 60/690,763, filed Jun. 14, 2005, by Thomas Dean Lovett, et al., and entitled DYNAMIC HARDWARE PARTITIONING OF SYMMETRIC MULTIPROCESSING SYSTEMS;

U.S. Non-Provisional application Ser. No. 11/057,120, filed Feb. 12, 2005, by Nakul Saraiya, et al., and entitled TEMPLATE SYSTEM FOR PROVISIONING AND MANAGEMENT OF FABRIC-BACKPLANE ENTERPRISE SERVERS;

U.S. Non-Provisional application Ser. No. 11/057,048, filed Feb. 12, 2005, by Nakul Saraiya, et al., and entitled PROGRAMMATIC INSTANTIATION, PROVISIONING, AND MANAGEMENT OF FABRIC-BACKPLANE ENTERPRISE SERVERS;

U.S. Non-Provisional application Ser. No. 11/057,117, filed Feb. 12, 2005, by Sharad Mehrotra, et al., and entitled CONTROL AGENT MANAGEMENT OF MULTI-CHASSIS FABRIC-BACKPLANE ENTERPRISE SERVERS;

U.S. Non-Provisional application Ser. No. 11/057,035, filed Feb. 12, 2005, by Sharad Mehrotra, et al., and entitled MULTI-CHASSIS FABRIC-BACKPLANE ENTERPRISE SERVERS;

U.S. Non-Provisional application Ser. No. 11/057,112, filed Feb. 12, 2005, by Thomas Dean Lovett, et al., and entitled INPUT/OUTPUT CONTROLLER FOR COUPLING THE PROCESSOR-MEMORY COMPLEX TO THE FABRIC IN FABRIC-BACKPLANE ENTERPRISE SERVERS;

U.S. Non-Provisional application Ser. No. 11/057,119, filed Feb. 12, 2005, by Thomas Dean Lovett, et al., and entitled FABRIC ADDRESS AND SUB-ADDRESS RESOLUTION IN FABRIC-BACKPLANE ENTERPRISE SERVERS;

U.S. Non-Provisional application Ser. No. 11/057,036, filed Feb. 12, 2005, by Thomas Dean Lovett, et al., and entitled PROCESSOR-MEMORY MODULE PERFORMANCE ACCELERATION IN FABRIC-BACKPLANE ENTERPRISE SERVERS;

U.S. Non-Provisional application Ser. No. 11/057,037, filed Feb. 12, 2005, by Thomas Dean Lovett, et al., and entitled FRAME FORWARDING LOOKUPS IN FABRIC-BACKPLANE ENTERPRISE SERVERS;

U.S. Non-Provisional application Ser. No. 10/889,469, filed Jul. 12, 2004, by Thomas Dean Lovett, et al., and entitled COMPUTE RESOURCES FOR FABRIC-BACKPLANE ENTERPRISE SERVERS;

U.S. Non-Provisional application Ser. No. 10/889,467, filed Jul. 12, 2004, by Sharad Mehrotra, et al., and entitled CLIENT-SERVER AND APPLICATION MODELS IN FABRIC-BACKPLANE ENTERPRISE SERVERS;

U.S. Non-Provisional application Ser. No. 10/889,468, filed Jul. 12, 2004, by Sharad Mehrotra, et al., and entitled FABRIC-BACKPLANE ENTERPRISE SERVERS; and U.S. Non-Provisional application Ser. No. 11/057,116, filed Feb. 12, 2005, by Thomas Dean Lovett, et al., and entitled FABRIC-BACKPLANE ENTERPRISE SERVERS WITH VNICS AND VLANS.

BACKGROUND

1. Field

Advancements in multiprocessor organization, provisioning, management, and interoperation are needed to provide improvements in performance, efficiency, and utility of use.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes. Nothing herein is to be construed as an admission that any of the references are pertinent prior art, nor does it constitute any admission as to the contents or date of actual publication of these documents.

Symmetric multiprocessing systems provide extensive compute resources. What are needed are effective techniques for managing the compute resources efficiently and reliably.

SUMMARY

The invention can be implemented in numerous ways, including as a process, an article of manufacture, an apparatus, a system, a composition of matter, and a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Illustrative Combinations that tersely summarize illustrative systems and methods in accordance with the concepts taught herein. As is discussed in more detail in the Conclusions, the invention encompasses all possible modifications and variations within the scope of the issued claims, which are appended to the very end of the issued patent.

BRIEF DESCRIPTION OF THE DRAWINGS

Various embodiments of the invention are disclosed in the following detailed description and the accompanying drawings.

FIGS. 5A-5G illustrate selected snapshots of a sequence of processing related to an embodiment of dynamic hardware partitioning.

DETAILED DESCRIPTION

Figure 1:
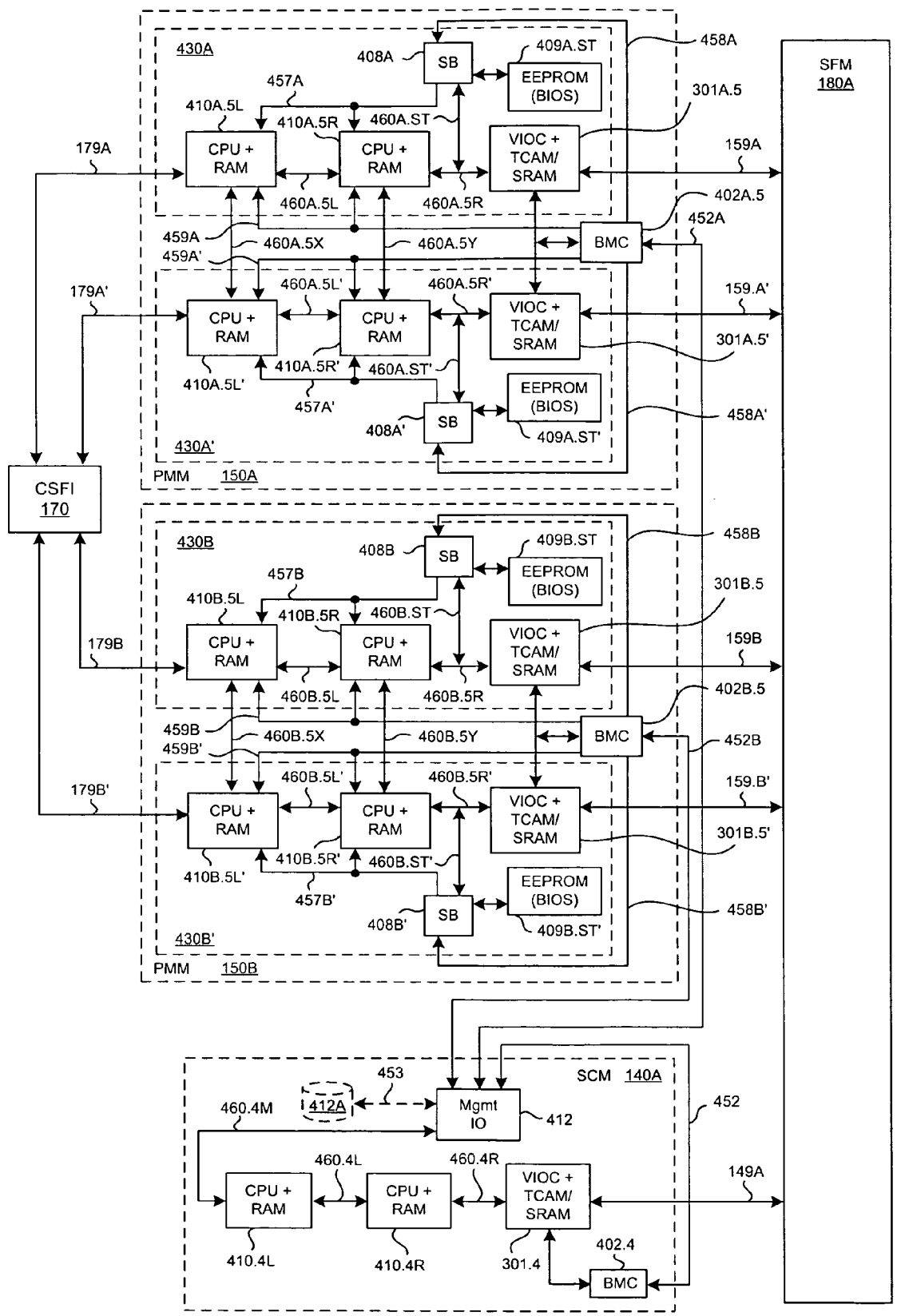
FIG. 1 illustrates an embodiment of a Symmetric Multi-Processing (SMP) system implementing dynamic hardware partitioning.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Introduction

This introduction is included only to facilitate the more rapid understanding of the Detailed Description. The invention is not limited to the concepts presented in the introduction, as the paragraphs of any introduction are necessarily an abridged view of the entire subject and are not meant to be an exhaustive or restrictive description. For example, the introduction that follows provides overview information limited by space and organization to only certain embodiments. There are in fact many other embodiments, including those to which claims will ultimately be drawn, which are discussed throughout the balance of the specification.

Dynamic hardware partitioning of SMP systems enables on-the-fly provisioning of servers of varying performance characteristics by configuring physical partitions having selectable numbers of processors. For example a first physical partition may include two processors (implementing a 2-way multiprocessing system), and a second physical partition may include four processors ((implementing a 4-way multiprocessing system). Physical partitions are formed as follows. Processors and optionally Input/Output (I/O) resources are selected for inclusion in the first and second physical partitions. Then the processors are directed to disable included coherency links (for example by de-asserting respective Power-Good indicators to each of the processors). Bootstrap and peripheral resources corresponding to the I/O resources are optionally disabled. Then the processors selected for inclusion in the first physical partition are directed to form coherency links with all adjacent processors (for example by asserting the respective Power-Good indicators to each of the processors of the first physical partition). All other processors in the system are instructed to remain isolated with respect to coherency transactions (i.e. their respective Power-Good indicators remain de-asserted). Bootstrap and peripheral resources (if disabled) are enabled for at least one processor of the first physical partition. The processors of the first physical partition are then directed to fetch and execute instructions (for example by de-asserting respective Reset indicators to each of the processors). The processors of the first physical partition complete booting. Then the second physical partition is formed starting with directing the processors selected for inclusion in the second physical partition to form coherency links with all adjacent process, and continues in a manner similar to the first physical partition boot.

In some embodiments SMPs are used to implement portions of flexible, cost-effective Enterprise Server (ES) systems having hardware elements that are dynamically partitionable into provisioned servers of varying computation capabilities. The provisioned servers may be dynamically created, used for execution of application functions, and later released to free resources for creating other provisioned servers. Creating (or provisioning) the provisioned servers includes configuring a partitionable SMP into one or more independent SMPs, or physical partitions. For example, a pluggable module, such as a Processor Memory Module (PMM), having four Central Processing Units (CPUs) may be configured as a single 4-way SMP (using all four CPUs simultaneously), or the module may be configured as a pair of 2-way SMPs (each SMP using two CPUs simultaneously). As another example, a pair of PMMs may be configured as a single 8-way SMP (using the two sets of four CPUs simultaneously).

The CPUs included on PMMs may implement SMP memory and cache coherency operations in part by configurable point-to-point communication links coupling various combinations of the CPUs together, according to physical partitioning requirements. In some implementations the CPUs are Advanced Micro Devices (AMD) Opteron processors and the links are HyperTransport (HT) links.

In some embodiments dynamic hardware partitioning includes configuring PMMs to operate as one or more individual physical partitions (at the granularity of a 2-way SMP complex, or half-PMM), with each physical partition having variable numbers of half-PMMs (i.e. 2-way, 4-way, and 8-way SMPs, for example). In some embodiments the physical partitioning includes booting each physical partition one at a time, and thus each physical partition is booted in series with the other physical partitions. In some embodiments the physical partitioning includes booting more than one physical partition at a time, thus enabling booting physical partitions in parallel. Other physical partition boot orderings are contemplated. Boot operations in physical partitions coupled by coherency links are coordinated such that processors in the coupled physical partitions are prevented from simultaneously being in an intermediate state (i.e. either not being held in reset or not being fully booted).

Overall the physical partitioning process includes two broad phases performed by hardware (after selecting partition and I/O resources to be included in the physical partitioning), and a third broad phase controlled by firmware, such as Basic Input/Output System (BIOS) code, prior to enabling memory accesses for the CPUs of the physical partition. The two hardware phases include providing both link initialization and processor fetch directives (including optional bootstrap and peripheral resource control disabling/enabling/resetting) individually to each SMP complex at the granularity of all possible physical partition boundaries. In other words, if each CPU may be assigned to a respective separate physical partition, then each CPU receives distinct link initialization and reset directives. If each CPU-pair, or 2-way SMP complex (for example, each half-PMM), may be allocated to respective separate partitions, then each CPU-pair receives distinct directives. Those of ordinary skill in the art will recognize how to extend this technique to forming physical partitions of arbitrary sizes and configuring them according to arbitrary partitioning granularities.

In descriptions of various embodiments the term "isolate" is used with respect to memory and cache coherency transactions, as performed between CPUs of an SMP complex, and as communicated by coherency links (such as HT links). In other words, "isolating" two SMP complexes (or physical partitions) from each other prevents the two physical partitions from exchanging coherency information and thus each of the physical partitions behaves as a distinct SMP system.

The physical partitioning process includes one or more of the following, according to embodiment. All of the CPUs of the next physical partition to be booted are known as the "partition CPUs". One of the partition CPUs is selected to operate as a Boot Strap Processor (BSP), corresponding, in some embodiments, to the CPU with a direct path to bootstrap hardware. The BSP is the only one of the partition CPUs to boot BIOS and to interface to an enabled SouthBridge (SB). As part of the first broad phase performed in hardware, all CPUs of PMMs in the ES system that are not operating in an active partition are directed to disable all of their respective SMP coherency links, thus isolating each of the CPUs from each other. As part of the second broad phase performed in hardware, any redundant or duplicated peripheral and bootstrap resources not needed in the next physical partition to be booted are disabled. In some embodiments the peripheral and bootstrap resource disabling leaves the BSP CPU with a direct path to bootstrap hardware. The redundant resources may include any combination of peripheral devices or interfaces, such as SBs, bootstrap firmware, such as included in Read Only Memories (ROMs), and other peripherals. Bootstrap and peripheral resources associated with the BSP CPU are enabled (if otherwise disabled). The partition CPUs are simultaneously directed to initialize and connect their respective coherency links. In response the partition CPUs enable their respective coherency links to form an SMP complex extending to all of the partition CPUs. The coherency links coupling to CPUs not in the partition remain disabled, however, thus isolating the partition CPUs from the other CPUs. The partition CPUs are then directed to begin fetching and executing instructions. A selected one of the partition CPUs functions as the BootStrap Processor (BSP) while the remaining partition CPUs function as Application Processors (APs). In some embodiments the BSP corresponds to the partition CPU having enabled bootstrap and peripheral resources.

As part of the third broad phase controlled by firmware, instructions executed by any combination of the partition CPUs complete initialization and configuration of the coherency links associated with the partition CPUs. The BSP executes BIOS code and signals completion of the partition boot process. The physical partition is now booted, and booting of the next physical partition proceeds. Physical partition booting continues until all physical partitions have been booted.

In some embodiments a CPU is directed to disable its coherency links by a dedicated command, while in other embodiments disabling coherency links is in response to a more general command. The general command may be a command to place the CPU in a relatively inactive state or a command indicating power supplied to the CPU is not available or is not stable. For example, in response to de-assertion of a "Power-Good" indicator or signal, or a combination of indicators or signals denoting a Power-Not-Good command, the CPU may disable its coherency links.

A CPU may be directed to initialize its coherency links by any combination of a dedicated command and a more general command, according to embodiment. The general command may be a command to release the CPU from the relatively inactive state or a command indicating power supplied to the CPU is available and stable. For example, in response to assertion of the Power-Good indicator or signal, or a Power-Good command, the CPU may enable and initialize its coherency links.

In some embodiments a CPU is directed to begin processing instructions by a specific command or by cessation of a "wait to process instructions" command (such as by removal of a reset command indication). Any combination of the specific command to begin processing and the reset command indication may be communicated by a dedicated signal or selected encodings on a plurality of signals shared for other purposes.

In some embodiments where the CPU is an Opteron processor, de-assertion of a "PWROK" signal deactivates the HT links of the processor, thus isolating the processor from other processors. Assertion of the PWROK signal (in some implementations while a "RESET_L" signal is asserted) begins initialization of the HT links of the Opteron processor (a so-called "cold reset" initialization), and subsequent de-assertion of the "RESET_L" signal (while PWROK remains asserted) results in the processor attempting to fetch and execute instructions.

Any number of physical partitions may be formed, each including any number of respective CPUs, limited only by CPU and coherency link resources available. Furthermore, physical partitions may be formed and later CPUs of one or more of the formed physical partitions may be freed. The freed CPUs may then be used to form new physical partitions that may be of a differing number and respective CPU capacity than the partitions before the CPUs were freed. For example, a 4-way SMP physical partition may be freed and the four CPUs formed into a pair of 2-way SMP physical partitions.

The physical partitioning process results in SMP processing complexes that function independently of each other. Software executing on one physical partition is unable to access resources or affect operations of other physical partitions (except by way of mutually agreed inter-process communication protocols). Hardware faults in the one physical partition are isolated to the one partition and are prevented from propagating to the other partitions. In some embodiments, each physical partition is enabled to access Input/Output (I/O) resources (such as network and storage resources) included in the ES system to enable Operating System (OS) boot and application program execution.

Illustrative Combinations

A first embodiment of a system including a plurality of compute elements, each having a respective boot resource; boot circuitry enabled to disable all but one of the boot resources and enable the one boot resource, and direct all of the compute elements of the portion to fetch instructions;

wherein the compute element having the enabled boot resource programs routing tables associated with the coherency link interfaces to enable shared-memory coherency transactions between the compute elements of the portion; and wherein the compute elements having the disabled boot resources access instructions from the enabled boot resource via the enabled shared-memory coherency transactions in response to the directing to fetch instructions.

The first embodiment wherein each of the compute elements is a symmetric multiprocessor. The first embodiment wherein the compute elements are included in a physically-partitionable symmetric multiprocessor. The first embodiment wherein the boot circuitry is further enabled to direct a portion of the compute elements to initialize coherency link interfaces included therein to isolate all of the compute elements of the portion from each other. The aforementioned embodiment wherein at least one of the coherency link interfaces is compatible with a HyperTransport (HT) link. The first embodiment wherein the compute elements are capable of communicating inter-process data via a switch fabric. The first embodiment wherein the disabling of the all but one of the boot resources includes providing a test-mode request to a group of pins of each of the respective all but one of the boot resources, and in response the respective all but one of the boot resources float respective output pins to high-impedance. Any of the aforementioned embodiments wherein the one boot resource includes a SouthBridge. Any of the aforementioned embodiments wherein the SouthBridge provides access to Basic Input/Output System (BIOS) instructions.

A second embodiment of a method including the steps of directing a plurality of compute elements to isolate themselves from each other by disabling included coherent memory link endpoints; and then directing a first plurality of the compute elements to aggregate themselves into a first physical partition by enabling the coherent memory link endpoints included in the first plurality of compute elements. A third embodiment of the second embodiment and further including directing the first physical partition to isolate itself by disabling the coherent memory link endpoints included in the first plurality of compute elements that are coupled to a disabled one of the coherent memory link endpoints. A fourth embodiment of the third embodiment and further including directing a second plurality of the compute elements to aggregate themselves into a second physical partition by enabling the coherent memory link endpoints included in the second plurality of compute elements. A fifth embodiment of the fourth embodiment and further including directing the second physical partition to isolate itself by disabling the coherent memory link endpoints included in the second plurality of compute elements that are coupled to a disabled one of the coherent memory link endpoints. A sixth embodiment of the fifth embodiment and further including further including directing the first plurality of compute elements to isolate themselves from each other by disabling the coherent memory link endpoints included in the first plurality of compute elements.

A seventh embodiment of the fifth embodiment and further including disabling all but one boot resource of a plurality of boot resources included in the first physical partition and enabling the one boot resource. The aforementioned embodiment wherein a configuration file identifies one of the first plurality of the compute elements as a boot processor. The aforementioned embodiment wherein the boot processor is enabled to communicate with the one boot resource via a boot resource interface that is distinct from the coherent memory link endpoints. The aforementioned embodiment wherein the disabling the all but one boot resource of the boot resources includes directing each of the all but one boot resource of the boot resources to float respective output pins to a high impedance state. The fifth embodiment and further including disabling all but one peripheral interface of a plurality of peripheral interfaces included in the first physical partition and enabling the one peripheral interface. The fifth embodiment and further including directing the physical partitions to exchange inter-process communication data. The aforementioned embodiment wherein the inter-process communication data is exchanged via a coupled switch fabric.

Any of the second, third, fourth, fifth, sixth, and seventh embodiments wherein each of the coherent memory link endpoints are arranged in pairs that are operable, when the two endpoints of the pair are enabled, to communicate bidirectional shared memory coherency traffic between the pair of compute elements that include the respective memory link endpoint pair. Any of the fourth, fifth, sixth, and seventh embodiments wherein the first plurality of compute elements are distinct from the second plurality of compute elements. Any of the second through the immediately aforementioned embodiment wherein the compute elements are included in a plurality of physically partitionable symmetric multiprocessor modules.

Any of the aforementioned embodiments having compute elements wherein the compute elements are symmetric multiprocessors. Any of the aforementioned embodiments having a physically-partitionable symmetric multiprocessor wherein the physically-partitionable symmetric multiprocessor is implemented via pluggable modules. Any of the aforementioned embodiments having pluggable modules wherein the pluggable modules are Processor Memory Modules (PMMs). Any of the aforementioned embodiments having boot resources wherein at least one of the boot resources includes a SouthBridge. Any of the aforementioned embodiments having coherency link interfaces wherein at least one of the coherency link interfaces is compatible with a HyperTransport (HT) link. Any of the aforementioned embodiments having coherent memory link endpoints wherein at least one of the coherent memory link endpoints is compatible with a HyperTransport (HT) link.

Dynamic Partitioning System

FIG. 1 illustrates selected portions of an embodiment of an SMP system implementing dynamic hardware partitioning. PMM 150A and PMM 150B are coupled to System Control Module (SCM) 140A via SFM 180A. PMM 150A and PMM 150B are further coupled to SCM 140A via management couplings 452A and 452B, respectively. The two PMMs are further coupled to each other via Coherency Switch Fabric and Interconnect (CSFI) 170. ES systems may include additional modules (for networking and storage resources, for example) coupled to the SFM that are not included in the illustration.

PMM and SCM elements share many similar characteristics. For example, each of the modules includes a fabric interface communication unit included in a Virtual Input/Output Controller (VIOC). Each of the modules may include one or more computation and memory elements. Couplings between elements of the modules may operate in the same or substantially similar fashion. These similarities are illustrated by common element presentation and identification, as follows.

A combination of a CPU and associated Randomly Accessible read/write Memory (RAM) elements is illustrated as a CPU+RAM element having an identifier prefixed with 410, and these elements are, in some implementations, Opteron processors coupled to Dynamic Random Access Memories (DRAMs). A combination of a VIOC coupled to a Ternary Content Addressable Memory (TCAM) and a Static Random Access Memory (SRAM) is illustrated as a VIOC+TCAM/SRAM element having an identifier prefixed with 301. Baseboard Management Controller (BMC) elements are prefixed with 402. HyperTransport (HT) channel couplings are shown with identifiers prefixed with 460 and 179. SouthBridge (SB) devices are shown with identifiers prefixed with 408, and associated coupled Electrically Erasable Programmable Read-Only Memories (EEPROMs) have identifiers prefixed with 409. Couplings providing Reset request indications to an SB are shown with identifiers prefixed with 458A, and couplings providing Reset request indicators (from an SB) to a CPU are shown with identifiers prefixed with 457A. Couplings providing Power-Good signaling have identifiers prefixed with 459A.

Those of ordinary skill in the art will recognize that while the aforementioned elements shown with common prefix identifiers are closely related to each other in operation and function, they are not identical, and may differ in various characteristics. Differences may include size, organization, bandwidth, capacity, or speed, according to embodiment. Such differences have no effect on the overall operation of the associated pluggable module.

Primary SCM 140A includes compute and associated memory elements CPU+RAM 410.4L coupled to CPU+RAM 410.4R via HT coupling 460.4L. VIOC+TCAM/SRAM 301.4 is coupled to CPU 410.4R via HT coupling 460.R. VIOC+TCAM/SRAM 301.4 provides a fabric interface for SCM-Fabric coupling 149A. Management I/O 412 is coupled to CPU+RAM 410.4L via HT coupling 460.4M and provides an interface to the intra-chassis BMCs via couplings 452, 452A, and 452B. Primary SCM 140A also includes BMC 402.4 coupled to VIOC+TCAM/SRAM 301.4 and Management I/O 412. Mass Storage 412A is coupled to Management I/O 412 via coupling 453 and provides local mass storage. Primary SFM 180A includes a plurality of fabric ports with respective fabric port addresses. The fabric ports are coupled via SCM-Fabric coupling 149A and PMM-Fabric couplings 159A, 159A', 159B, and 159B'.

PMM 150A and PMM 150B are identical in the illustrated embodiment, and only PMM 150A is described in detail. PMM 150A is arranged as a pair of identical sections, Half-PMM 430A and Half-PMM 430A'. Each section includes two CPU+RAM elements coupled to each other by HT links, a VIOC+TCAM/SRAM element interfacing to a fabric coupling, and an SB having a coupled EEPROM providing storage for BIOS code. The two Half-PMMs share BMC 402A.5.

The two Half-PMMs are coupled to each other by a pair of HT links (HT couplings 460A.5× and 460A.5Y). One of the CPUs of each half-PMM also provides an HT interface for coupling to PMM 150B via CSFI-PMM coupling 179A and CSFI-PMM coupling 179A'. As illustrated, HT coupling between PMMs 150A and 150B is via intermediary CSFI 170. Shared memory coherency and cache memory coherency transactions may be communicated over the HT couplings internal to the PMM (460A.5L, 460A.5×, 460A.5L', and 460A.5Y) and over HT couplings external to the PMM (179A, and 179A'). The HT couplings that may be enabled for communicating the coherency transactions as well as the CSFI thus function as SMP coherency links.

The coherency links are configurable to provide for physical partitioning of the CPU+RAM elements of PMMs. In some embodiments the PMM is configured as a single 4-way physical partition by configuring the internal HT links (460A.5L, 460A.5×, 460A.5L', and 460A.5Y) for coherent operation, and configuring the external HT links (179A, and 179A') for "isolated" operation (i.e. links 179A and 179A' are disabled). In other embodiments, isolating a PMM for configuration as a single 4-way physical partition (or as two 2-way physical partitions) is performed in part by configuring CSFI 170 to isolate the PMM.

The PMM is configured as a pair of identical 2-way physical partitions (Half-PMM 430A and Half-PMM 430A') by configuring a portion of the internal HT links (460A.5L, and 460A.5L') for coherent operation, and another portion of the internal HT links (460A.5×, and 460A.5Y) for isolated operation. The external HT links (179A, and 179A') or CSFI 170 are also configured for isolated operation.

A plurality of PMMs are configured as a single unified 8-way physical partition by configuring all of the internal and external HT links of all of the PMMs (and also CSFI 170, depending on the embodiment) for coherent operation. Those of ordinary skill in the art will recognize that an arbitrary number and arrangement of physical partitions may be configured from PMMs, as limited only by the available resources, using the techniques described.

In operation, SFM 180A routes data (for example, interprocess, network, and storage data) as cells provided via a fabric ingress port to a fabric egress port, according to a cell destination address. Each of dataplane couplings 149A, 159A, 159A', 159B, and 159B' couples with a respective fabric ingress port and a respective fabric egress port.

Primary SCM 140A executes any combination of management, controlplane, and load balancing processes using compute and memory resources provided by CPU+RAM 410.4L and CPU+RAM 410.4R. The CPUs operate as a single SMP complex, communicating shared memory coherency and cache memory coherency transactions via HT coupling 460.4L.

Each VIOC operates as an intelligent I/O device responding to commands from the CPUs. Packet images are read from RAM coupled to the CPUs and communicated as cells to an associated fabric ingress port. Each VIOC also operates in the reverse direction, receiving cells from a fabric egress port, and assembling and storing corresponding packet information into RAM.

The management process (or processes) executing on the CPUs of Primary SCM 140A communicate management and configuration control information via Management I/O 412 between Primary SCM 140A and BMCs included in PMMs 150A and 150B via management couplings 452A and 452B, respectively. In some embodiments any portion of the management and configuration control information may be communicated via SFM 180A.

The configuration information may include physical partitioning information and commands received and acted upon by the BMCs of the PMMs. The partitioning commands may take the form of a sequence of one or more coherency link control operations such as low-level directives to disable/enable HT links of a half-PMM. The partitioning commands may further take the form of low-level directives to enable code fetch and execution with respect to a half-PMM.

Physical partitions may be established that have one-half of a PMM (2-way), a single PMM (4-way), or two PMMs (8-way). It will be understood that the number of SMP-ways per half of a PMM is merely illustrative and not limiting as is the configurable topology for aggregation of SMP-ways. Application, Driver, and OS processes are executed on the resultant physical partitions. Each resultant physical partition always includes at least one VIOC. The VIOC provides for communication between the executing processes and other clients of the fabric via packet images in memory.

In some embodiments CSFI 170 corresponds to an inserted coherency link switch, separate from HT link functionality included in the CPUs. In some embodiments CSFI 170 corresponds to simple interconnect (wires) directly coupling HT link ports of one CPU to another.

In some embodiments CPU+RAM elements of PMMs (such as CPU+RAM 410A.5L) are implemented as Opteron processors and HT couplings or links (such as 460.5L, 460A.5x, and 179A) correspond to direct couplings to HT ports provided by an Opteron. In some of the embodiments having Opterons, CSFI 170 implements direct coupling between 179A and 179B and between 179A' and 179B' (i.e. there is no control function within the CSFI). Implementation of the low-level directives may include manipulation of one or more sets of signals or indicators, each set being dedicated to a respective half-PMM.

The low-level directive to disable HT links of a half-PMM may be implemented by de-assertion of a dedicated Power-Good signal or indicator to the half-PMM (the indicator being coupled to the PWROK signals of the Opterons of the half-PMM). For example, a directive to disable HT links of Half-PMM 430A may be implemented by de-assertion of Power-Good coupling 459A by BMC 402A.5 and results in the HT ports of CPU+RAM 410A.5L and CPU+RAM 410A.5R being deactivated. The result is that HT couplings 460A.5L, 460A.5R, 460A.5x, 460A.5Y and 179A become inoperable, thus isolating CPU+RAM 410A.5L and CPU+RAM 410A.5R. Note that the directive targets a specific half-PMM; i.e. Power-Good couplings 459A', 459B, and 459B' to other Half-PMMs (430A', 430B, and 430B', respectively) are unaffected.

Similarly, the low-level directive to enable HT links of a half-PMM may be implemented by assertion of the Power-Good signal or indicator dedicated to the half-PMM. Continuing with the previous example, assertion of Power-Good coupling 459A results in HT couplings 460A.5L, 460A.5R, 460A.5x, 460A.5Y and 179A being activated and probed for connectivity. Links internal to the half-PMM (460A.5L and 460A.5R) are found to couple to active elements. Links external to the half-PMM (460A.5x, 460A.5Y and 179A) are found to couple to active elements only if elements at respective external endpoints are active (CPU+RAM 410A.5L', CPU+RAM 410A.5R', and CPU+RAM 410B.5L, respectively).

The low-level directive to enable code fetch and execution may be implemented by de-assertion of a dedicated Reset signal or indicator to the half-PMM (the indicator being coupled to the RESET_L signals of the Opterons of the half-PMM). For example, a directive to enable code fetch and execution for CPUs in Half-PMM 430A is implemented by de-assertion of Reset-to-SB coupling 458A and results in de-assertion of Reset-to-CPU coupling 457A. Reset-to-CPU coupling 457A is coupled to CPU+RAM 410A.5L and CPU+RAM 410A.5R, and as a result of the de-assertion, CPU+RAM 410A.5L and CPU+RAM 410A.5R attempt to fetch and execute code.

SB devices may couple directly to an HT link (such as SB 408A connected to HT coupling 460A.ST), or indirectly to an HT link via an intermediate Peripheral Component Interconnect (PCI) or PCI-X compatible bus, according to embodiment. An example of an SB adapted to couple directly to an HT coupling is an AMD-8111 HyperTransport I/O Hub, and an example of an SB adapted to couple to a PCI-X bus is an AMD-768 Peripheral Bus Controller. In some embodiments one or more HT tunnel devices are included in HT couplings having taps to SB devices (such as HT coupling 460A.5R tapped to HT coupling 460A.ST). In some embodiments the tunnel devices (such as AMD-8131 HyperTransport PCI-X Tunnel devices) may provide one or more PCI-X compatible taps for coupling to PCI-X adapted SB devices.

Physical Partition Formation and Boot

Forming and booting physical partitions begins with management software (in some embodiments executing on an SCM) identifying various resources (such as SMP elements of PMMs) to allocate to provisioned servers according to various requirements and constraints. In some embodiments SMP element allocation is according to half-PMM units, resulting in provisioned servers having 2-way, 4-way, and 8-way compute complexes, for example. The management (or provisioning) software determines BMC commands necessary to configure the PMMs according to the SMP element allocation, directing individual half-PMMs as needed. Typically all half-PMMs in an ES system are directed to disable all coherency links, and then physical partitions are booted one at a time in series, under the direction of the management software. Booting each physical partition includes enabling the coherency links associated with the physical partition, followed by instructing the CPUs of the partition to begin fetching and executing code.

Figure 2:
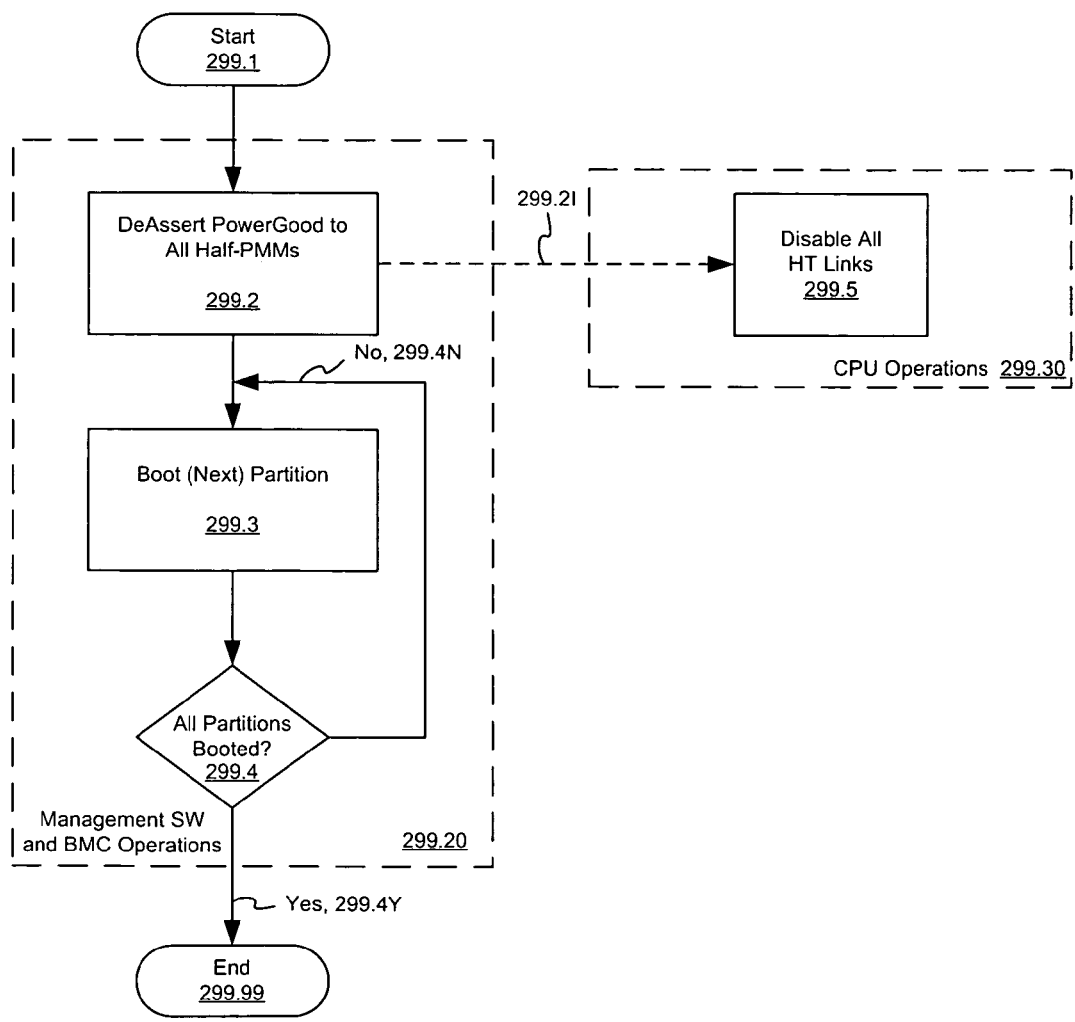
FIG. 2 illustrates a flowchart of selected details of an embodiment of forming and booting a plurality of physical partitions.

FIG. 2 illustrates a flowchart of selected details of an embodiment of forming and booting a plurality of physical partitions. Processing by management software and BMCs of PMMs is illustrated in "Management Software and BMC Operations" 299.20, and processing by CPUs of PMMs is depicted in "CPU Operations" 299.30. Flow begins ("Start" 299.1) in response to management software determining a need to form and boot one or more provisioned servers, in response to an automatically (software) or manually (system administrator) generated request, according to various usage scenarios.

Processing continues ("DeAssert PowerGood to All Half-PMMs" 299.2), wherein the management software issues commands to the PMMs (such as PMMs 150A and 150B of FIG. 1), that are to provide CPU resources for the physical partitions to be formed and booted. More specifically, the commands are sent to the BMCs of the PMMs (BMCs 402A.5 and 402B.5, respectively) and include directives to disable all HT links for all half-PMMs. In response, BMC 402A.5 de-asserts PWROK to Half-PMM 430A (and Half-PMM 430A') via de-assertion of Power-Good coupling 459A (and Power-Good coupling 459A'). Similarly, BMC 402B.5 de-asserts PWROK to Half-PMM 430B (and Half-PMM 430B') via de-assertion of Power-Good coupling 459B (and Power-Good coupling 459B'). In some embodiments one directive is sent to each BMC and each directive requests both half-PMMs coupled to the respective BMC to disable their HT links. In some embodiments two directives are sent to each BMC, and each directive requests a specific half-PMM coupled to the respective BMC to disable its HT links.

In response to de-assertion of PWROK (as indicated conceptually by dashed-arrow 299.2I), the CPUs of each respective half-PMM disable their respective HT links ("Disable All HT Links" 299.5). As a result, all of the CPUs of the PMMs are isolated from each other, i.e. no coherency transactions are exchanged between the CPUs.

Management software and BMC processing continues ("Boot (Next) Partition" 299.3), where a next physical partition is selected for configuration and preparation for starting of execution. In some embodiments the management software performs the selection and provides specific BMC commands to direct booting. Then a determination is made, in some implementations, by the management software, as to whether all physical partitions are configured and started ("All Partitions Booted?" 299.4). If so ("Yes" 299.4Y), then processing is complete ("End" 299.99). If not ("No" 299.4N), then processing loops back to configure and boot the next partition.

Physical Partition Boot Details

Booting each physical partition includes providing power to the half-PMMs of the partition (if power is not already applied), and then directing the CPUs of the partition to initialize and connect their respective coherency links. The CPUs are then directed to fetch and execute instructions. In response the CPUs configure their respective coherency links for operation and then begin to fetch and execute instructions. A selected one of the CPUs (in some embodiments chosen by the management software) operates as a BSP, while the remaining CPUs of the partition operate as APs. When the BSP provides a BIOS heartbeat the partition is successfully booted.

Figure 3:
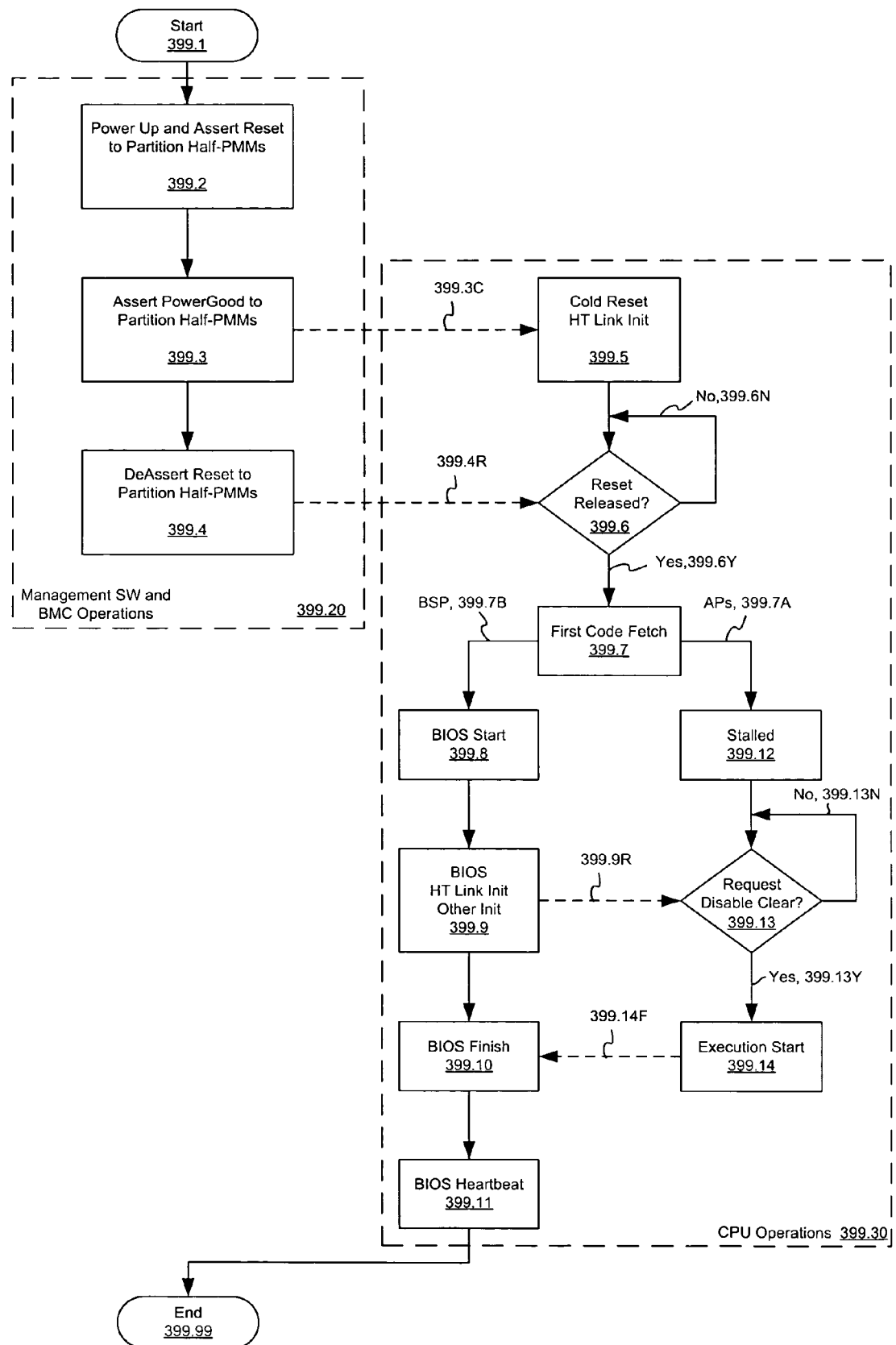
FIG. 3 illustrates a flowchart of selected details of an embodiment of booting a physical partition.

FIG. 3 illustrates a flowchart of selected details of an embodiment of booting a physical partition, such as operations performed as part of processing relating to "Boot (Next) Partition" 299.3. Processing by management software and BMCs of PMMs is illustrated in "Management Software and BMC Operations" 399.20, and processing by CPUs of PMMs is depicted in "CPU Operations" 399.30. Flow begins ("Start" 399.1) in response to management software directing a physical partition to boot.

Processing continues ("Power Up and Assert Reset to Partition Half-PMMs" 399.2), wherein the management software issues commands to selected BMCs to power up and reset the half-PMMs of the physical partition. The BMCs selected correspond to those that are coupled to the half-PMMs of the physical partition. In some embodiments a BMC may provide control for more than one half-PMM (such as BMC 402A.5 controlling Half-PMMs 430A and 430A'). Therefore the BMCs are selected accordingly and the Power-Up commands identify specific half-PMMs to power up. In response, each selected BMC provides power while asserting RESET_L (indirectly via a corresponding SB) to the respective specified one or more half-PMMs. For example, Half-PMM 430A is directed to remain in a reset state by BMC 402A.5 via assertion of Reset-to-SB coupling 458A. In response, SB 408A asserts RESET_L to Half-PMM 430A via assertion of Reset-to-CPU coupling 457A, and in some embodiments the SB also disables or resets various bootstrap and peripheral resources. Processing proceeds when all of the half-PMMs of the partition are powered up and in reset.

Processing continues ("Assert PowerGood to Partition Half-PMMs" 399.3), where the management software issues commands to the selected BMCs to direct the half-PMMs of the partition to initialize their respective coherency links. In response each selected BMC asserts PWROK to the respective specified one or more half-PMMs (via assertion of one or more indicators such as Power-Good coupling 459A). Processing continues ("De-Assert Reset to Partition Half-PMMs" 399.4), wherein the management software issues commands to the selected BMCs to direct the half-PMMs of the partition to exit reset and begin fetching and executing code. In response each selected BMC de-asserts RESET_L (indirectly via SBs) to the half-PMMs of the partition, and in some embodiments at least one SB enables access to the bootstrap and peripheral resources.

In some embodiments processing relating to any combination of "Power Up and Assert Reset to Partition Half-PMMs" 399.2, "Assert PowerGood to Partition Half-PMMs" 399.3, and "De-Assert Reset to Partition Half-PMMs" 399.4 is in response to a single command from the management software. In other words, the BMC may operate partially autonomously from the management software. In some embodiments BMC autonomous operation is according to one or more embodiments of a BMC Operational State Machine.

In response to the assertion of the respective PWROK signal(s) (as indicated conceptually by dashed-arrow 399.3C), the CPUs of each of the one or more half-PMMs of the physical partition enable their respective HT links via a link initialization sequence ("Cold Reset HT Link Init" 399.5). The HT link enabling includes determining if the link is coherent or incoherent (links coupling CPUs may be coherent), and determining a width and a frequency associated with the operation of the link according to both ends of the link. Thus the internal HT links of the physical partition become operational at a low level. Processing then continues by determining whether reset has been released ("Reset Released?" 399.6). The determination is dependent on de-assertion of RESET_L, as indicated conceptually by dashed-arrow 399.4R. If reset has not been deactivated ("No" 399.6N), then processing loops back to repeat the determination.

If reset has been de-asserted ("Yes" 399.6Y), then processing continues ("First Code Fetch" 399.7). Recall that "CPU Operations" 399.30 is representative of operations performed by a plurality of CPUs (all of those of the physical partition). Subsequent processing is dependent on whether the respective CPU operates as the single BSP of the partition or as one of the one or more APs of the partition. The subsequent processing is also performed by the single BSP and the one or more APs substantially independently and in parallel, except where explicit communication and/or synchronization is illustrated (such as by dashed-arrows 399.9R and 399.14F). A CPU having direct access to boot resources such as a BIOS ROM (for example a CPU directly attached to an enabled SB) marks itself as a BSP, and other processors mark themselves as APs.

Processing for the BSP proceeds ("BSP" 399.7B) to ("BIOS Start" 399.8), wherein the BSP begins fetching and executing BIOS code. The BIOS code is, in some implementations, provided by a flash memory device (such as EEPROM 409A.ST providing code to CPU+RAM 410A.5R). Processing continues ("BIOS HT Link Init; Other Init" 399.9), where the BSP executes BIOS code to complete initialization of the HT links of the entire physical partition.

The BSP (such as CPU+RAM 410.5R) begins the initialization process by detecting all APs in the physical partition, starting from APs the BSP is adjacent to (such as CPU+RAM 410.5L). As the BSP discovers APs, the BSP determines respective node identifiers and establishes HT routing table entries for the node. After all of the APs have been detected, routing table entries have been established, and HT link control registers have been initialized, the BSP initializes non-coherent HT devices. Then respective HT link width and frequency operational parameters may be modified. The BSP then configures a memory controller included on each respective CPU (itself and all APs). Note that after completing the initialization process, no references to external links of the physical partition are included in the HT routing tables of the CPUs of the physical partition.

BIOS execution completes other initialization work and then the request disable bits of all of the APs are cleared, enabling the APs to begin execution. In some embodiments all of the HT routing tables are programmed before clearing any of the request disable bits. In other embodiments after an HT routing table for a CPU is programmed the corresponding request disable bit is cleared, thus enabling at least a portion of the APs to begin execution before all of the HT routing tables are programmed.

Processing continues ("BIOS Finish" 399.10), where in some embodiments an optional handshake (indicated conceptually by dashed-arrow 399.14F) is received from each of the APs indicating the respective AP has begun execution. Processing proceeds to provide an indication of completion of physical partition boot ("BIOS Heartbeat" 399.11), and processing is then complete ("End" 399.99).

Processing for each of the one or more APs ("APs" 399.7A) begins with a first instruction code fetch in response to de-assertion of RESET_L. However, the code fetch is not successful ("Stalled" 399.12) due to at least two reasons. First, only a single SB in the physical partition is enabled, i.e. the SB being accessed by the BSP. All other SBs (if any) in the physical partition have been disabled. Second, the HT routing tables are not yet initialized, so the APs are not able to access the enabled SB via the BSP. Therefore the AP code fetch fails.

Processing continues to a wait loop ("Request Disable Clear?" 399.13). While the request disable bit is not cleared ("No" 399.13N), processing loops back. When the reset disable bit is cleared ("Yes" 399.13Y), subsequent to programming of the HT routing tables associated with the AP and indicated conceptually by dashed-arrow 399.9R, flow proceeds ("Execution Start" 399.14) and the AP begins processing instructions. In some embodiments BIOS code selectively determines if a CPU executing the BIOS code is a BSP or an AP by examination of a BSP bit in an "APIC_BASE" register. If the CPU is determined to be a BSP, then BIOS boot continues to execute. If the CPU is found to be an AP, then BIOS boot terminates after the AP has been prepared to receive an interrupt, and the AP processing is suspended until an interrupt is received.

Note that processing relating to "Stalled" 399.12, "Request Disable Clear?" 399.13, and "Execution Start" 399.14 occurs independently and substantially in parallel for all of the APs of the physical partition.

After completion of the physical partition boot sequence, all of the CPUs of the physical partition are configured to transact coherency operations via the enabled HT links, thus forming an SMP processing complex for the physical partition. In some embodiments booting of a next physical partition is serialized with the BSP BIOS execution providing the heartbeat indication. In other embodiments booting the next partition is serialized with completing the HT link enabling and associated routing table initializations.

In some embodiments the CPU to become the BSP is determined in part by an ability to reach bootstrap code (such as BIOS code) via an HT link coupling, in some implementations via an enabled SB (a disabled SB is unable to provide access to BIOS code). At the time of BSP self-determination, all of the CPUs of the physical partition are isolated from other CPUs of the ES system, so only HT links internal to the physical partition are enabled to provide bootstrap code. Furthermore, HT routing tables and other HT initialization are not yet performed, so a bootstrap code request from a CPU of the physical partition is not effectively passed through any other CPU. Thus only CPUs having "direct" access to enabled SBs are eligible to become BSPs.

Examples of CPUs having such direct access to SBs include a CPU having an HT link directly coupling to an HT-compatible SB and an HT link coupling indirectly through an HT tunnel device to an SB. More specifically, CPU+RAM 410A.5R of FIG. 1 may be eligible to become a BSP, while CPU+RAM 410A.5L may not, as it has no direct or tunnel link to an SB. In some embodiments more than one CPU may be eligible to become the BSP for a physical partition (for example when the physical partition is formed from more than a single half-PMM, such as a 4-way or an 8-way SMP complex). The CPU to become the BSP is determined in an implementation dependent manner, and the associated SB is enabled while all other SBs in the physical partition are disabled.

In some embodiments industry-standard BIOS code is executed during processing relating to "BIOS Start" 399.8, "BIOS HT Link Init; Other Init" 399.9, and "BIOS Finish" 399.10. The industry-standard BIOS code attempts to discover all processors and all devices attached to all HT links, and to any HT links supplied by the attached devices, until all devices reachable by the CPU the BIOS code is executing on have been identified. The industry-standard BIOS processing assumes only a single BSP exists in the SMP instance, and also assumes all reachable CPUs are to be included in the SMP instance.

In other embodiments specialized BIOS code is executed that receives information (via software executing elsewhere in the ES system) specifying physical partition topology and required coherency link activation and deactivation. The specialized BIOS code enables and disables various combinations of coherency link transmitters and receivers, according to the desired topology, to provide the specified physical partition topology. In other words, firmware selectively activates coherency links internal to each physical partition, and selectively deactivates coherency links crossing between (or coupling together) different physical partitions. The firmware may execute in series on each BSP of each respective physical partition, may execute substantially in parallel on each BSP (even those of "adjacent" physical partitions having an coherency link electrically wired, but inactive, between them), or any combination thereof. In these embodiments some of the hardware physical partitioning processes may be omitted. For example it may not be necessary to individually sequence various physical partitions into and out of the reset state. It may not be necessary to individually direct physical partitions to initialize coherency links.

In a related variant embodiment, specialized BIOS code establishes coherency link routing information only according to the desired physical partition topology, effectively isolating physical partitions from one another. Dynamic modification of the physical partitioning requires modifications to the routing information, but no modifications to low-level link initialization (assuming all coherency links are initialized to active). In the variant embodiment one or more of the hardware physical partitioning processes may be omitted, as in the specialized BIOS code embodiment that enables/disables the coherency links.

In some embodiments coherency link switches are inserted between CPUs at one or more boundaries corresponding to possible physical partition edges, and the switches are controlled to provide any portion of isolation between physical partitions. Switches may be inserted in every coherency link or inserted only in coherency links that may be configured to separate physical partitions. Switches may also be inserted only at pluggable-module boundaries (such as CSFI 170 of FIG. 1), according to embodiment. The switches may be configured to provide isolation or routing of any portion of the coherency links. The inserted switches may be controlled by hardware (such as BMCs), firmware (such as BIOS code), or any combination thereof.

In some embodiments low-level control of coherency links, including selective enabling/disabling of link endpoints, is implemented to isolate physical partitions from one another and to couple CPUs within each physical partition to each other. In embodiments having HT links, HT transmitters, HT receivers, or both may be controlled by any combination of HT debug transactions, JTAG scan chain transactions, and "LDTSTOP"/"LDTTRISTATE" signals, according to implementation. Subsequent to configuring the HT links the CPUs boot.

In some embodiments hardware control of power state is at a larger granularity than the smallest physical partition boundaries. For example, an entire PMM may be powered up or powered down, but the two half-PMMs of the PMM are always in the same hardware power state (up or down). However, industry-standard OSes may assume exclusive control of power state associated with the underlying execution resources (i.e. the CPUs of the physical partition). A virtual power state is provided by an implementation dependent agent to the OS to allow the hardware power state of a physical partition to diverge from the power state assumed by the OS executing on the physical partition. In some embodiments the hardware control of power state is at the same (or smaller) granularity as the smallest physical partition boundaries, and the hardware power state is provided directly to OSes executing on the partitions.

In some embodiments physical partition booting is not completely serialized, and a more parallel booting sequence is implemented. Consider a first and a second group of half-PMMs to be formed into respective first and second physical partitions, and also consider a third group of half-PMMs not to be included in either the first or the second physical partition. The first physical partition may boot in parallel with the second physical partition as long as the three groups remain isolated from each other. More generally, physical partitions may boot in parallel as long as during link initialization and CPU boot each parallel booting partition remains isolated from all other parallel booting partitions, all previously booted physical partitions, and all CPUs as yet not included in any physical partitions.

Conceptually the coherency links associated with a physical partition (i.e. the coherency links of all of the CPUs of the partition) may be considered to be "internal" to the partition or "external" to the partition. The internal links are those providing communication between CPUs of the physical partition, and the external links are the remainder of the links of the CPUs. While a physical partition is being formed, the links that are to become external links remain disabled (to provide isolation), and the links that are to become internal links are allowed to become active.

The required isolation may be provided in part by the previously booted partitions keeping their respective external coherency links inactive by appropriate BIOS or related low-level code operations (or prevention of operations such as enabling any external link). The required isolation may be provided in part by continuously directing otherwise inactive CPUs (those CPUs not yet allocated to a physical partition, for example), having coherency links to any of the CPUs of the booting partitions, to keep their respective coherency links inactive. The inactive CPUs may be directed to keep their coherency links inactive by de-assertion of a Power-Good indicator. In embodiments having inserted coherency link switches, the isolation may be provided in part by directing the switches to prevent communication between the parallel booting partitions and other elements.

Physical partitions formed according to the aforementioned techniques may also be "un-formed", i.e. the CPUs of one or more of the formed physical partitions may be freed to enable formation of one or more new physical partitions. Any work being performed by the partitions to be freed is completed or otherwise ended, the CPUs of the partitions to be freed are directed to stop fetching and executing code, and then the CPUs are directed to inactivate their respective coherency links. The CPUs are then available for allocation to new physical partitions. Any number and combination of formed physical partitions may be reclaimed for assignment to new physical partitions.

Figure 4:
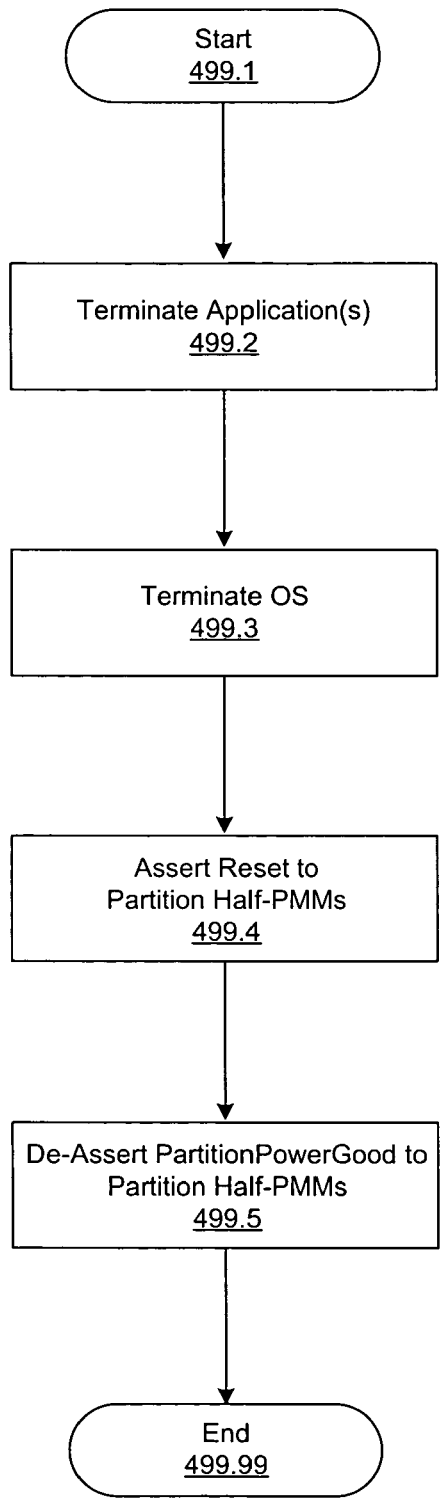
FIG. 4 illustrates a flowchart of selected details of an embodiment of shutting down and reclaiming CPU resources of a physical partition.

FIG. 4 illustrates a flowchart of selected details of an embodiment of shutting down and reclaiming CPU resources of a physical partition. The illustrated processing may occur in various combinations of management software and BMCs of PMMs (such as a BMC implementing a BMC Operational State Machine) associated with the physical partition to be reclaimed. Flow begins ("Start" 499.1) in response to management software directing a physical partition to shut down, in response to an automatically (software) or manually (system administrator) generated request, according to various usage scenarios.

Processing continues ("Terminate Application(s)" 499.2), where all currently executing application programs are ended via coordination with one or more OS processes. Flow then proceeds to end processing associated with the OS ("Terminate OS" 499.3). At this point none of the CPUs of the physical partition are performing useful work and may be deactivated.

Processing continues ("Assert Reset to Partition Half-PMMs" 499.4), wherein the management software issues commands to selected BMCs to reset the half-PMMs of the physical partition. The BMCs selected correspond to those that are coupled to the half-PMMs of the partition. Since in some embodiments a BMC may provide control for more than a single half-PMM, the commands identify specific half-PMMs to reset. In response, each selected BMC asserts RESET_L to the respective specified one or more half-PMMs (in some implementations via a corresponding SB).

For a first shut down example, consider a 2-way SMP physical partition formed with Half-PMM 430A that is shut down. BMC 402A.5 is directed to reset the half-PMM (specifically identified as Half-PMM 430A), and in response asserts Reset-to-SB coupling 458A. SB 408A then asserts RESET_L to Half-PMM 430A via assertion of Reset-to-CPU coupling 457A, and also optionally disables, resets, or both any associated bootstrap and peripheral resources. CPU+RAMs 410A.5L and 410A.5R then stop fetching and executing instructions.

For a second shut down example, consider a 4-way SMP physical partition formed with Half-PMMs 430A and 430A' that is reclaimed. BMC 402A.5 is directed to reset the half-PMMs (specifically identified as Half-PMMs 430A and 430A'), and in response asserts Reset-to-SB couplings 458A and 458A'. SBs 408A and 408A' then respectively assert RESET_L to Half-PMMs 430A and 430A' via respective assertion of Reset-to-CPU couplings 457A and 457A', and also optionally disable, reset, or both any associated bootstrap and peripheral resources. CPU+RAMs 410A.5L, 410A.5R, 410A.5L', and 410A.5R' then stop fetching and executing instructions.

Subsequent to stopping instruction execution for the CPUs of the physical partition, flow continues to ("De-Assert PowerGood to Partition Half-PMMs" 499.5), where the management software issues further commands to the same BMCs selected to reset the half-PMMs, but the further commands direct the specified half-PMMs to disable their respective HT links. In response, each selected BMC asserts PWROK to one or more specified half-PMMs, and the CPUs of the affected half-PMMs disable their respective HT links.

Continuing with the aforementioned first shut down example, BMC 402A.5 is directed to deactivate the coherency links of the half-PMM (specifically identified as Half-PMM 430A), and in response de-asserts PWROK to Half-PMM 430A via de-assertion of Power-Good coupling 459A. CPU+ RAMs 410A.5L and 410A.5R then disable their respective HT links.

Continuing with the aforementioned second shut down example, BMC 402A.5 is directed to deactivate the coherency links of the half-PMMs (specifically identified as Half-PMMs 430A and 430A'), and in response de-asserts PWROK to Half-PMM 430A and de-asserts PWROK to Half-PMM 430A' via de-assertion of Power-Good couplings 459A and 459A', respectively. CPU+RAMs 410A.5L, 410A.5R, 410A.5L', and 410A.5R' then disable their respective HT links.

After the CPUs of the physical partition have disabled their respective HT links, the half-PMMs of the physical partition may be optionally powered down in some embodiments if they are not to be immediately allocated to a new physical partition. Processing to shut down and reclaim the physical partition is then complete ("End" 499.99).

In some embodiments processing relating to any combination of "Assert Reset to Partition Half-PMMs" 499.4 and "De-Assert PowerGood to Partition Half-PMMs" 499.5 is in response to a single command from the management software, as the BMC may perform autonomous operations. In some embodiments the BMC autonomous operation is according to the BMC Operational State Machine(s).

Dynamic Partitioning Example

An example is useful to illustrate various operational aspects of dynamic hardware partitioning. In the following description, an ES system having a pair of PMMs is configured into three provisioned servers, having respectively a 4-way SMP complex, a first 2-way SMP complex, and a second 2-way SMP complex. Subsequently the 4-way SMP complex server is "torn down" (i.e. shut down and reclaimed) and then "rebuilt" (or re-provisioned) as a third 2-way SMP complex and a fourth 2-way SMP complex, resulting in four provisioned servers. Those of ordinary skill in the art will recognize that the example is not limiting, and that provisioned servers may be dynamically partitioned, the effects of the partitioning undone, and new partitioning effected, in any combination and variation as allowed by available system resources.

FIGS. 5A-5G illustrate seven selected snapshots of a monotonically increasing time sequence of processing related to an embodiment of dynamic hardware partitioning. The figures represent a conceptual subset of elements of FIG. 1, with like identified elements being identical in operation. In the illustrations, operational HT links are shown as solid lines, while non-operational (or disabled) HT links are shown as dotted lines. HT links not directly related to SMP operation (such as HT links providing coupling to VIOC+TCAM/SRAM elements) are omitted for clarity.

FIG. 5A illustrates the first snapshot in the example sequence. The figure shows the results of management software directing the BMCs of the PMMs to disable all HT links for all of the half-PMMs (as in "DeAssert PowerGood to All Half-PMMs" 299.2 of FIG. 2). The four individual PWROK signals to each of Half-PMMs 430A, 430A', 430B, and 430B' have been de-asserted, resulting in all of the CPUs disabling their respective HT links. Thus all of the HT links are non-operational.

FIG. 5B illustrates the second snapshot in the example sequence. The figure shows the results of management software directing the formation of the 4-way SMP complex having Half-PMMs 430A and 430A'. The two individual PWROK signals to each of Half-PMMs 430A and 430A' have been asserted (as in "Assert PowerGood to Partition Half-PMMs" 399.3), resulting in the CPUs of the half-PMMs attempting to enable their respective HT links. The HT links internal to the 4-way physical partition are operational (460A.5L, 460A.5×, 460A.5L', and 460A.5Y), while all other HT links remain non-operational. The physical partition has been enabled to execute instructions via de-assertion of the two individual RESET_L signals to each of Half-PMMs 430A and 430A' (as in "De-Assert Reset to Partition Half-PMMs" 399.4 of FIG. 3) and enabled to complete booting. The HT routing tables of the CPUs of the 4-way SMP complex have been programmed (as in portions of "BIOS HT Link Init; Other Init" 399.9 of FIG. 3) to prevent use of external HT links of the partition (179A and 179') to ensure that the partition remains isolated with respect to subsequent physical partition boots.

FIG. 5C illustrates the third snapshot in the example sequence. The figure shows the results of management software directing the formation of the first 2-way SMP complex having half-PMM 430B. The PWROK signal to Half-PMM 430B has been asserted (as in "Assert PowerGood to Partition Half-PMMs" 399.3), resulting in the CPUs of the half-PMM attempting to enable their respective HT links. The HT link internal to the first 2-way physical partition is now operational (460B.5L), as are the internal links of the 4-way partition, while all other HT links remain non-operational. The physical partition has been enabled to execute instructions via de-assertion of the single RESET_L signal to Half-PMMs 430B (as in "De-Assert Reset to Partition Half-PMMs" 399.4 of FIG. 3) and enabled to complete booting. The HT routing tables of the CPUs of the first 2-way SMP complex have been programmed (as in portions of "BIOS HT Link Init; Other Init" 399.9 of FIG. 3) to prevent use of external HT links of the partition (179B, 460B.5×, and 460B.5Y) to ensure that the partition remains isolated with respect to subsequent physical partition boots.

FIG. 5D illustrates the fourth snapshot in the example sequence. The figure shows the results of management software directing the formation of the second 2-way SMP complex having half-PMM 430B'. Processing that has occurred is similar to the processing associated with FIG. 5C, including HT routing tables being programmed to exclude use of external links of the partition (179B', 460B.5×, and 460B.5Y), except Half-PMM 430B' is used in forming the physical partition. At this point all of the partitionable CPU resources of the system are in use. The three provisioned servers are isolated from each other due to non-operational HT links 179A, 179A', 179B, 179B', 460B.5× and 460B.5Y.

Figure 5F:
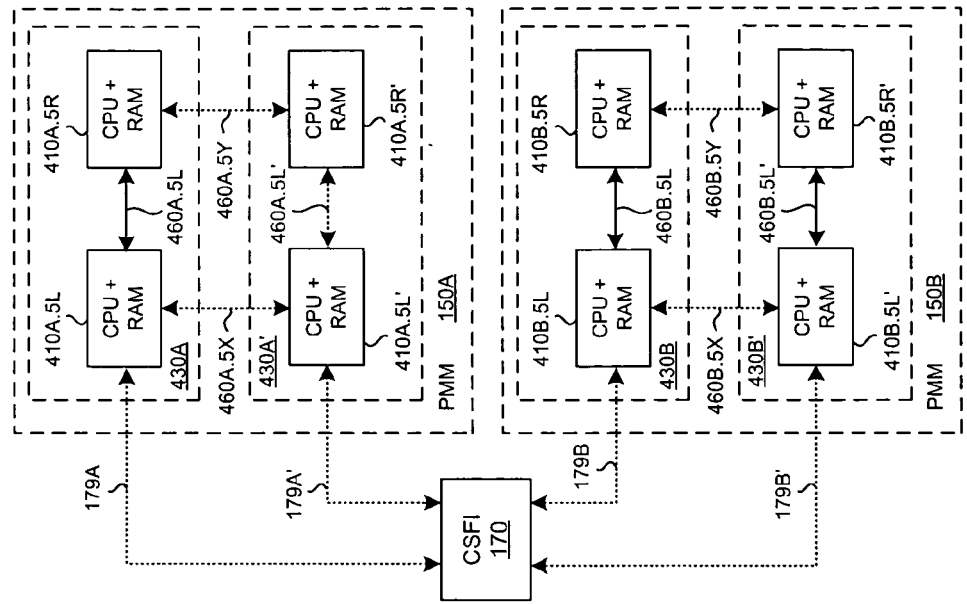
Figure 5E:
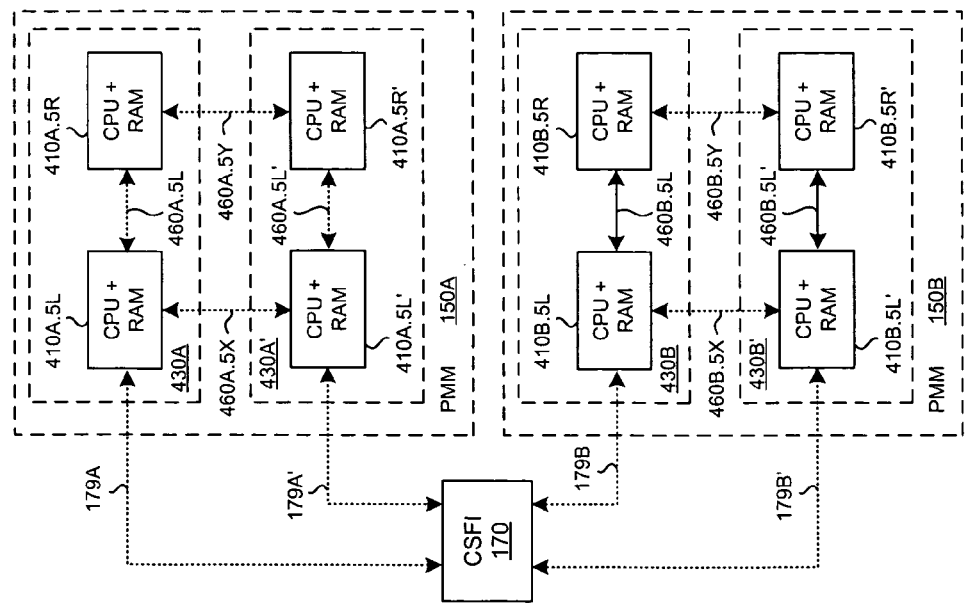

FIG. 5E illustrates the fifth snapshot in the example sequence. The figure shows the results of management software directing the 4-way SMP complex to shut down for reclamation. Application and OS processes have been terminated. The BMC controlling Half-PMMs 430A and 430A' has been directed to stop instruction execution in the half-PMMs of the physical partition (as in "Assert Reset to Partition Half-PMMs" 499.4 of FIG. 4). The two individual RESET_L signals to each of Half-PMMs 430A and 430A' have been asserted via respective SBs (not illustrated), resulting in the CPUs of Half-PMMs 430A and 430A' ceasing instruction fetch and execution. The BMC has been further directed to disable HT links for the two half-PMMs (as in "De-Assert PowerGood to Partition Half-PMMs" 499.5 of FIG. 4). The two individual PWROK signals to each of Half-PMMs 430A and 430A' have been de-asserted, resulting in the CPUs of the half-PMMs disabling their respective HT links. As illustrated, only internal HT links of the first and second 2-way physical partitions are operational (460B.5L, and 460B.5L').

FIG. 5F illustrates the sixth snapshot in the example sequence. The figure shows the results of management software directing the formation of the third 2-way SMP complex from selected elements reclaimed from the 4-way SMP complex. Processing that has occurred is similar to the processing associated with FIG. 5C (including HT routing tables being programmed to exclude use of external links of the partition), except Half-PMM 430A is used in forming the physical partition.

FIG. 5G illustrates the seventh snapshot in the example sequence. The figure shows the results of management software directing the formation of the fourth 2-way SMP complex from selected elements reclaimed from the 4-way SMP complex. Processing that has occurred is similar to the processing associated with FIG. 5C (including HT routing tables being programmed to exclude use of external links of the partition), except that Half-PMM 430A' is used in forming the physical partition. At this point all of the partitionable CPU resources of the system are in use. The four provisioned servers are isolated from each other due to non-operational HT links 179A, 179A', 179B, 179B', 460A.5×, 460A.5Y, 460B.5×, and 460B.5Y.

BMC Command and Low-Level Hardware Boot Processing

Figure 6A:
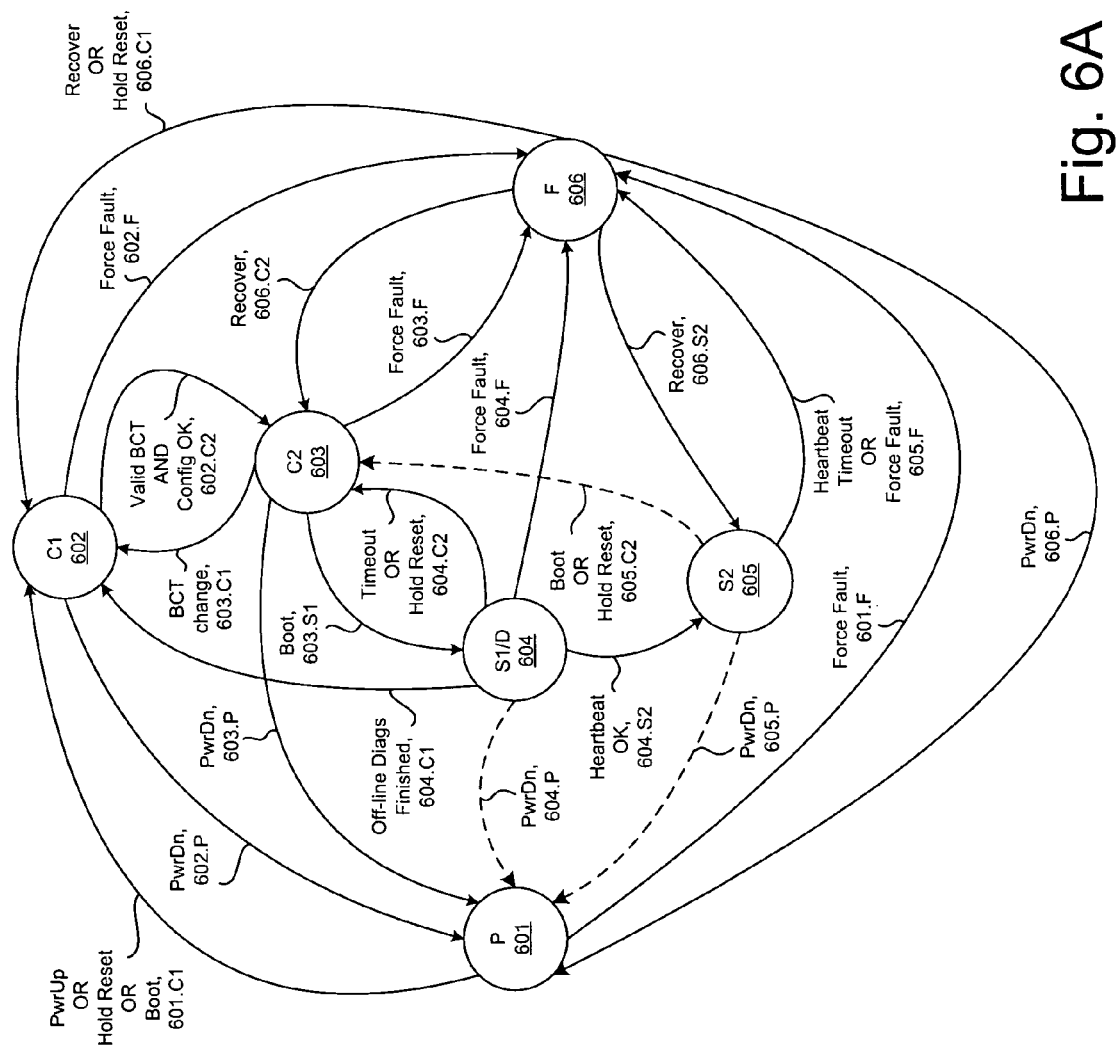
FIG. 6A is a state diagram illustrating processing of selected Baseboard Management Controller (BMC) related commands in an ES embodiment.

FIG. 6A is a state diagram illustrating processing of selected BMC related commands in an ES embodiment. In some embodiments, all or any portion of BMC commands are implemented as IPMI type commands, and in some of these embodiments, an IPMI Client may provide interface functions for communication with a Command Agent. The BMC commands may be provided by a Chassis Manager (CM) and processed by BMC SW.

In some embodiments, the BMC SW implements processing of BMC commands via a BMC Operational State Machine, and the figure is representative of states and transitions of these embodiments. In other embodiments, the BMC command processing is performed by any combination of SW and HW. In some embodiments, a plurality of BMC state machine instances are provided on a module (such as a PMM), one for each possible partition the module may be partitioned into. In some embodiments, the BMC Operational State Machine receives IPMI commands and passes them through to an IPMI implementation, returning IPMI status from the IPMI implementation if needed. Some BMC events correspond to pass-through IPMI events, such as Sensor Threshold Breached, described elsewhere herein. The figure conforms to the convention that the state machine remains in a state unless one of the illustrated transitions is activated ("loopback" transitions are omitted for clarity).

In some embodiments, whenever the state machine transitions to a new state, the transition is reported to a CM as one or more events that describe the resultant state. The transitions are recognized as a status change and event signaling follows. In some embodiments, the events include information concerning the transition or the cause for the transition.

Consider the BMC Operational State Machine as starting in state P 601. In this state, the module the BMC is included in is powered up only sufficiently for operation of the BMC sub-system, and other elements of the module remain powered down. BMC sub-system elements related to detecting selected module status information, receiving CM commands, and delivering event information to the CM are operational. In some embodiments, these elements include execution of all or portions an Event Agent and a Command Agent.

While in state P 601, if the CM sends commands including any of Module Power Up, Module Hold Reset, and Module Boot to the BMC, then the state machine transitions to state C1 602 via transition "Power Up OR Hold Reset OR Boot" 601.C1. In some embodiments the transition corresponds to or initiates HT link initialization (such as "Cold Reset HT Link Init" 399.5 of FIG. 3). State C1 generally corresponds to a first or minimal configuration. If the command was Module Power Up, then state C1 602 is the end state for processing the command. If the command was Module Hold Reset, then when conditions for transition "Valid BCT AND Configuration Complete OK" 602.C2 are met, the state machine transitions to state C2 603, and this is the end state for processing the Module Hold Reset command. State C2 generally corresponds to a second or customized configuration. If the command was Module Boot, then the state machine transitions first to state C2 603 as Module Hold Reset. Then, when conditions for transition "Boot" 603.S1 are met, the state machine transitions to state S1/D 604, followed by a transition to state S2 605 when conditions for transition "Heartbeat OK" 604.S2 are met, and this is the end state for processing the Module Boot command.

In some embodiments the transition "Boot" 603.S1 corresponds to processing initiated upon release of reset (such as "Yes" 399.6Y of FIG. 3 and subsequent BSP and AP specific processing) and occurs substantially in parallel for a plurality of CPUs, such as all of the CPUs to be included in a physical partition being formed.

While in state C1 602, power is applied to all of the elements on the module, in addition to the BMC sub-system, and reset is active to any system or application processing elements. For example, CPUs included on PMMs, PCEs and TMs included on NMs, IOPs included on FCMs, and CPUs included on OLBs are continuously reset. If a Module Power Up command was being processed, then C1 is the final state, and is exited only upon receipt of another command. If a Module Power Down command is received, then the state machine transitions to state P 601 via transition "Power Down" 602.P. If a Module Force Fault command is received, then the state machine transitions to state F 606 via transition "Force Fault" 602.F.

If a Module Hold Reset or a Module Boot command is being processed, then C1 is a transient state, and is exited when the BMC sub-system detects or determines that the conditions for transition "Valid BCT AND Configuration Complete OK" 602.C2 are met. Specifically, the Boot Configuration Table (BCT) information received with the command being processed has been found to be valid, and any module configuration information included in the BCT information has been successfully applied to the module. Thus the module configuration is complete and the machine transitions to state C2 603.

While in state C2 603, reset remains active to the system and application processing elements. If a Module Hold Reset command was being processed, then C2 is the final state, and is exited only upon receipt of another command. If any command that provides new BCT information is received, then the state machine transitions to state C1602 via transition "BCT Change" 603.C1. If a Module Power Down command is received, then the state machine transitions to state P 601 via transition "Power Down" 603.P. If a Module Force Fault command is received, then the state machine transitions to state F 606 via transition "Force Fault" 603.F.

If a Module Boot command is being processed, then C2 is a transient state, and is exited when the BMC sub-system detects or determines that the conditions for transition "Boot" 603.S1 are met. Specifically, the BMC determines that an implementation dependent delay has transpired, and the state machine transitions to state S1/D 604.

While in state S1/D 604, reset is released, allowing the system and application processing elements to begin fetching and executing code. If a Module Hold Reset command is received, then the state machine transitions to state C2 603 via transition "Time Out OR Hold Reset" 604.C2. If a Module Power Down command is received, then the state machine transitions to state P 601 via transition "Power Down" 604.P. If a Module Force Fault command is received, then the state machine transitions to state F 606 via transition "Force Fault" 604.F.

If a Module Boot command is being processed, then S1/D is a transient state. If the conditions for transition "Heartbeat OK" 604.S2 are met, then the state machine transitions to state S2 605 via transition "Heartbeat OK" 604.S2. Specifically, the BMC sub-system receives a heartbeat indication from the system or application processor after the processor has executed sufficient start-up code (such as BIOS boot for a PMM) to communicate the heartbeat indication to the BMC. In some embodiments, BIOS execution communicates heartbeat information to the BMC via VIOC scratchpad registers.

However, if the BMC does not receive a heartbeat indication after a predetermined time interval, then the BMC Operational State Machine times out the operation, and transitions to state C2 603 via transition "Time Out OR Hold Reset" 604.C2. A special sub-case of the Module Boot command may specify (via information in the BCT) that off-line diagnostics are to be performed instead of a full boot. In this context, completion of the Module Boot command occurs when the off-line diagnostics are completed or have timed out. When this occurs, the state machine transitions to state C1 602 via transition "Offline Diagnostics Finished" 604.C1.

While in state S2 (the terminus of successful processing of a Module Boot command), reset to the processing elements remains released, and the processing elements continue executing instructions and periodically generating heartbeat indications to the state machine. If a predetermined period of time elapses without a heartbeat indication, then the state machine transitions to state F 606 via transition "Heartbeat Timeout OR Force Fault" 605.F.

If a Module Boot or a Module Hold Reset command is received, then the state machine transitions to state C2 603 via transition "Boot OR Hold Reset" 605.C2. If a Module Power Down command is received, then a transition is made to state P 601 via transition "Power Down" 605.P. If a Module Force Fault command is received, then a transition is made to state F 606 via transition "Heartbeat Timeout OR Force Fault" 605.F.

State F is a transient fault recovery state where an attempt is made to recover from whatever condition led to the transition into the state. If recovery from any non-fatal faults relating to state S2 is made, then the machine transitions to state F 606 via transition "Recover" 606.S2. If recovery from any fatal faults relating to states C2, S1/D, or S2 is made, then the machine transitions to state C2 603 via transition "Recover" 606.C2. If recovery from any fatal faults relating to state C1 is made, then a transition is made to state C1 602 via transition "Recover OR Hold Reset" 606.C1. A Module Hold Reset command overrides any in-progress or attempted recovery, and in response the machine transitions to state C1 602 via transition "Recover OR Hold Reset" 606.C1. A Module Power Down command is similarly overriding, and the machine moves to state P 601 via transition "Power Down" 606.P. The CM may issue a Module Power Down command in response to event information sent from the BMC indicating that the fault is an unrecoverable HW or SW failure, according to embodiment, or represents a catastrophic fault, also according to embodiment.

In some embodiments, command processing is dependent on the state of the BMC Operational State Machine. For example, if a Module Prepare to Boot, Module Hold Reset, or a Module Boot command is to be processed, then successful processing occurs only if none of the partitions in a chassis are in the C1, C2, S1, or F states.

In some embodiments, some server provisioning and management operations require issuing one or more BMC commands that are processed according to the illustrated state diagram. A first example is booting a server. If the server to be booted is configured with multiple modules (such as two PMMs), then two separate BMC command streams will be issued, one to each of the two PMMs (see FIG. 6B for an example). A second example is shutting down a server, resulting in separate Module Power Down commands to some or all of the modules the server was provisioned from.

In some embodiments, selected BMC commands are ignored (and an error status is returned) unless a force-execute bit included with the command is asserted. More specifically, if processing a BMC command would result in a state transition of the BMC Operational State Machine, then the force-execute bit must be asserted for the command to have an effect. Requiring assertion of the force-execute bit reduces the likelihood that a booted server is erroneously reset or powered down, since the reset or power down command would not be executed unless the force-execute bit is asserted. In some embodiments, only a portion of the BMC commands that would result in state transitions are dependent on the force-execute bit, such as commands that would result in an operational server becoming inoperable (reset or power-down of a running server, for example).

While the BMC Operational State Machine has been described with respect to selected BMC commands (such as Module Power Up, Module Power Down, Module Hold Reset, Module Boot, and Module Force Fault), this is only a representative embodiment. Any combination of BMC commands (such as those described in the Selected BMC Command Details section, elsewhere herein) may be implemented by the BMC state machine. Additionally, in some embodiments, any combination of BMC Commands illustrated with respect to the BMC state machine may be implemented by other mechanisms.

Those of ordinary skill in the art will note that the BMC Operational State Machine may be implemented in HW, SW, or any combination of the two, according to embodiment. It is also apparent than any number of state machine states and transitions may be implemented to provide similar functionality, according to embodiment.

Figure 6B:
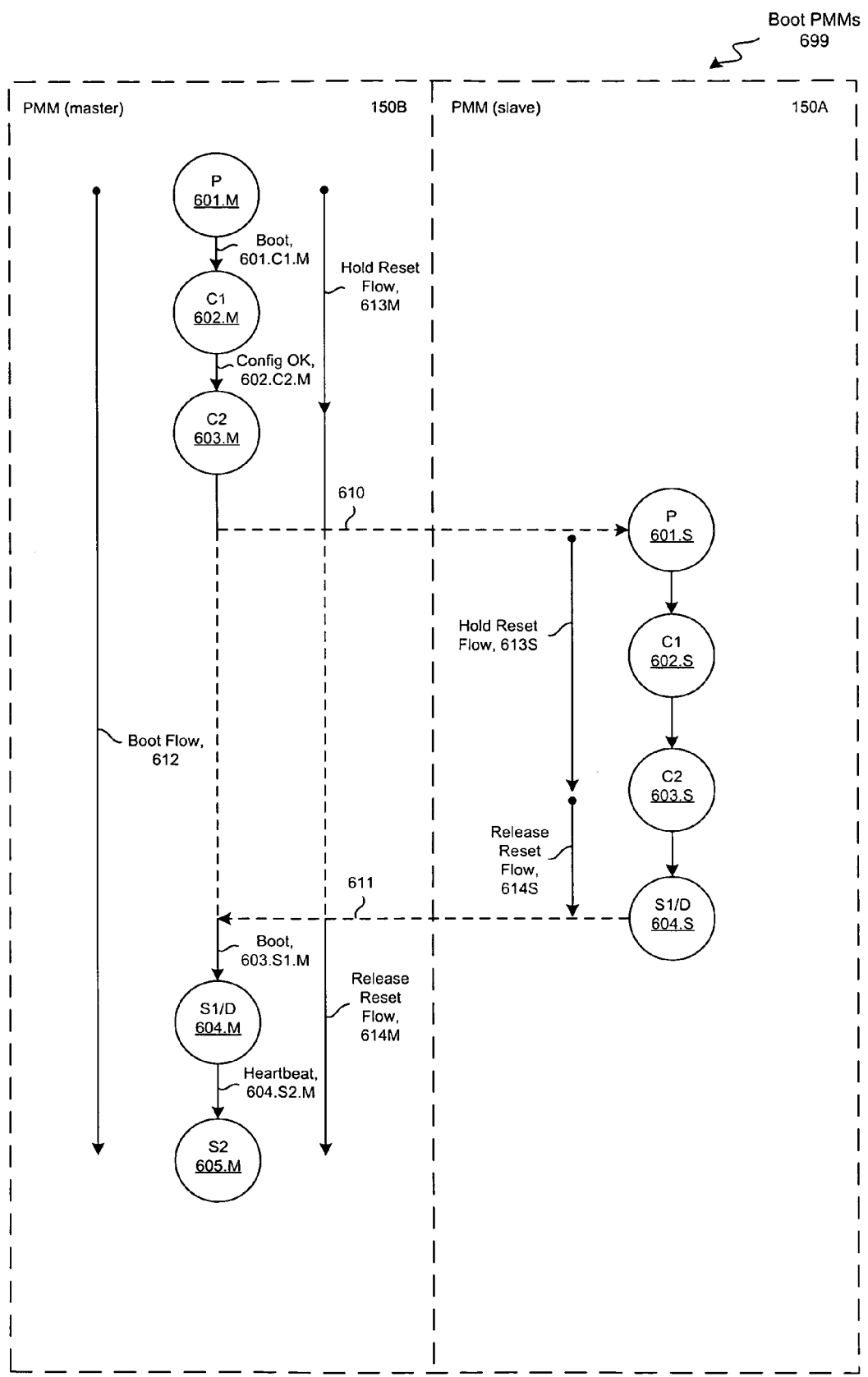
FIG. 6B illustrates selected operational aspects of single and dual PMM low-level hardware boot processing in an ES embodiment.

FIG. 6B illustrates selected operational aspects of single and dual PMM low-level hardware boot processing in an ES embodiment, such as processing related to "Boot PMM" operations. The processing illustrated in FIG. 6B conceptualizes selected paths through states as illustrated by FIG. 6A, with corresponding states and transitions named accordingly. FIG. 6B illustrates boot processing for a single PMM configuration (such as relating to either of PMMs 150A-B of FIG. 1) and a dual PMM configuration (such as relating to a combination of PMMs 150A-B of FIG. 1), and as such the generic Module commands described in FIG. 6A transitions correspond to specific PMM Module commands in the context of FIG. 6B. Conceptually a two-part sequencing is used to boot PMMs. First a HW initialization is performed, including ensuring power is on, initializing fabric communication HW, and performing board-level fabric initialization. Second a SW start-up is performed, including releasing reset and then allowing BIOS and subsequent SW to boot. In some embodiments the HW initialization is in response to the Module Hold Reset command. In some embodiments the SW initialization is in response to the Module Boot command.

Operation in the single PMM configuration is as follows. "Boot Flow" 612 begins at state P 601.M, when the BMC on PMM 150B receives a PMM Boot command via a CM. The BMC Operational State Machine then moves to state C1 602.M via transition "Boot" 601.C1.M, and asserts reset to the PMM. When the BCT has been found to be valid and the configuration included therein has been properly applied to the PMM, the state machine moves to state C2 603.M via transition "Configuration Complete OK" 602.C2.M. The state machine then continues to state S1/D 604.M via transition "Boot" 603.S1.M, and releases reset to the PMM. The PMM then boots BIOS and generates a valid heartbeat. When the valid heartbeat from the PMM has been detected by the BMC, the machine moves to state S2 605.M via transition "Heartbeat OK" 604.S2.M, and the PMM boot flow is complete.

Each of the state machine transitions are reported to the CM via events describing the resultant state. For example, when the state machine has completed the transition to state C1 602, an event describing the new state machine state as "C1" is generated and delivered to the CM. Events are similarly generated and delivered for all of the state machine transitions.

Operation in the dual PMM configuration is as follows, with PMM 150B operating as the master, and PMM 150A operating as the slave. Conceptually, the master PMM is partially booted ("Hold Reset Flow" 613M), then the slave PMM is booted ("Hold Reset Flow" 613S and "Release Reset Flow" 614S), and then the master PMM is fully booted ("Release Reset Flow" 614M). The final slave PMM boot state is different than the master PMM boot state, as the slave PMM omits booting of BIOS and hence generates no heartbeat. Coordination of transitions between the master and slave PMMs are managed by the CM, via reception and processing of state transition events and issuing of appropriate commands to the master and slave BMCs on the respective PMMs.

More specifically, "Hold Reset Flow" 613M begins at state P 601.M, when the BMC on the master PMM (PMM 150B) receives a PMM Hold Reset command from a CM. The BMC Operational State Machine then moves to state C1 602.M (asserting reset to the master PMM) and then to state C2 603.M as in "Boot Flow" 612. However, the state machine remains in state C2 603.M when processing the PMM Hold Reset command (leaving reset asserted), instead of continuing as when processing a PMM Boot command. As in all of the BMC Operational State Machine transitions, an event is generated upon arrival in state C2 603.M and delivered to the CM.

In response (indicated conceptually by dashed-arrow 610) the CM sends a PMM Hold Reset command to the BMC on the slave PMM (PMM 150A). The slave BMC Operational State Machine then transitions from state P 601.S to state C1 602.S (asserting reset to the slave PMM) and then to state C2 603.S, where it remains, awaiting further CM commands. An event is generated and delivered to the CM indicating the slave BMC is now in the "C2" state. In response the CM provides a PMM Release Reset command to the slave BMC. The slave BMC then releases reset to the slave PMM and transitions to state S1/D 604.S, whereupon another event is delivered to the CM indicating arrival in the "S1/D" state.

In response (indicated conceptually by dashed-arrow 611) the CM sends a Release Reset command to the master BMC. The master BMC then transitions to state S1/D 604.M and releases reset to the master PMM. When BIOS boot is complete and the resultant heartbeat is detected, the master BMC Operational State Machine transitions to state S2 605.M and reports the new state to the CM. Booting of the dual PMM configuration is now complete, with both PMMs out of reset and the master PMM having booted BIOS.

In some embodiments the slave boot begins only after the master is configured a second time or configured in a more customized manner (such as in the C2 state). In some embodiments the slave boot proceeds as soon as the master is powered on and optionally minimally configured (such as in the C1 state).

According to embodiment, CM communication with BMCs is via any combination of transports and protocols. The transports include Ethernet (coupling 452 of FIG. 1, for example), an Intelligent Chassis Management Bus (ICMB), an Intelligent Platform Management Bus (IPMB), RS-485, RS-232, PCI mailboxes, in-band or out-of-band signaling over the SFM, and any other similar mechanisms. The protocols include TCP/IP and any similar protocols. The communications include events from BMCs to the CM, and commands from the CM to the BMCs.

Some embodiments provide for larger than 8-way SMPs, and in a first group of implementations, BMC coordination is via explicit CM control, as illustrated in FIG. 6B. In a second group of implementations, BMC SW instances communicate and cooperate with each other in a peer-to-peer mode, independent of explicit CM control coordination and sequencing.

In the aforementioned embodiments a BMC provides low-level sequencing and direction of half-PMMs (such as controlling PWROK and RESET_L signals). In other embodiments control logic implemented via any combination of hard-wired, firmware, and micro-coded mechanisms may provide the sequencing and direction. The control logic may be implemented in gate-array (mask, fuse, or field programmable) technology, standard-cell based integrated circuit technology, or various combinations of discrete logic chips and devices.

In the aforementioned embodiments CPUs of SMP complexes are identical (i.e. the SMPs are homogenous), and SMP elements available for configuring into physical partitions include identical numbers of CPUs (i.e. all are 2-way SMPs). In other embodiments the CPUs may differ as to processing frequency, bus bandwidth, instruction set, and other distinguishing characteristics. In some embodiments the available SMP elements may vary in numbers of CPUs (i.e. some may be 2-way SMPs while others may be indivisible 4-way SMPs or 1-way SMPs, i.e. single processors). These and all similar variations are contemplated.

In some embodiments a preferred BSP is determined by provisioned server configuration information. In response to the configuration information, during partition formation, a corresponding SB is enabled, and all other SBs of the physical partition are disabled. For example, a Server Configuration File (SCF) may specify one or more half-PMMs to include in a provisioned server as a physical partition. The SCF may also identify one of the CPUs of the included half-PMMs to operate as the BSP. The SB that is directly accessible by the identified CPU will be enabled, and all other SBs of the physical partition will be disabled. During partition formation the enabled SB will provide boot resources to the identified CPU, which in turn operates as the BSP, and the remaining CPUs of the physical partition then operate as APs.

In some embodiments an SB is disabled by rendering it inaccessible to system software and firmware, and preventing it from interfering with other hardware operations in a physical partition. In some implementations disabling an SB includes placing the SB in a mode where all outputs are in a high-impedance state. In various embodiments a dedicated pin may be asserted, a JTAG interface HIGHZ instruction, and a special test mode may be activated to force SB outputs to high impedance. The special test mode may be accessed by asserting a "TEST" signal while a PWROK signal is deasserted (in implementations using, for example, an AMD768 or an AMD8111 device). When PWROK is subsequently asserted (with TEST asserted) the SB enters a quiescent, high-impedance mode, and the SB is disabled. When PWROK and TEST are both deasserted the SB is enabled.

REFERENCES

Additional information regarding Opteron processors may be found in "AMD Opteron Product Data Sheet" from http://www.amd.com/us-en/assets/content_type/white_papers_and_tech_docs/23932.pdf, and "AMD Functional Data Sheet, 940 Pin Package" from http://www.amd.com/us-en/assets/content_type/white_papers_and_tech_docs/31412.pdf, herein incorporated by reference for all purposes.

Additional information regarding HT tunnel devices may be found in "AMD-8131TM HyperTransport PCI-X Tunnel Data Sheet", from http://www.amd.com/us-en/assets/content_type/white_papers_and_tech_docs/24637.pdf, herein incorporated by reference for all purposes. Additional information regarding SB devices may be found in "AMD-8111 HyperTransport I/O Hub Data Sheet", from http://www.amd.com/us-en/assets/content_type/white_papers_and_tech_docs/24674.pdf, and "AMD-768 Peripheral Bus Controller Data Sheet", October, 2001, from AMD, herein incorporated by reference for all purposes.

An overview of HT technology may be found in: "HyperTransport Technology I/O Link" from http://www.amd.com/us-en/assets/content_type/white_papers_and_tech_docs/HyperTransport_IO_Link_Whitepaper_25012A.pdf, and "HyperTransport I/O Technology Overview" from http://www.hypertransport.org/docs/wp/WhitePaper_HTC_WP02.pdf, herein incorporated by reference for all purposes. Information regarding HT link protocols may be found in "HyperTransport I/O Link Specification" from http://www.hypertransport.org/docucontrol/HTC20031217-0036-0009.pdf, herein incorporated by reference for all purposes. An overview of HT system design issues may be found in "HyperTransport Technology: Simplifying System_Design" from http://www.hypertransport.org/docs/wp/26635A_HT_System_Design.pdf, herein incorporated by reference for all purposes. Selected information regarding AMD Opteron HT link processing may be found in "BIOS and Kernel Developer's Guide for AMD Athlon 64 and AMD Opteron Processors" from http://www.amd.com/us-en/assets/content_type/white_papers_and_tech_docs/26094.PDF, herein incorporated by reference for all purposes. Other HT link processing information may be found in "Lightning Data Transport I/O Link Protocol Specification" from http://www.hypertransport.org/docs/spec/ldt_spec1.01a_with_comment.pdf, herein incorporated by reference for all purposes.

CONCLUSION

Although the foregoing embodiments have been described in some detail for purposes of clarity of understanding, the invention is not limited to the details provided. There are many alternative ways of implementing the invention. The disclosed embodiments are illustrative and not restrictive.

It will be understood that many variations in construction, arrangement and use are possible consistent with the teachings and within the scope of the claims appended to the issued patent. For example, interconnect and function-unit bit-widths, clock speeds, and the type of technology used may generally be varied in each component block. The names given to interconnect and logic are merely illustrative, and should not be construed as limiting the concepts taught. Also, unless specifically stated to the contrary, the value ranges specified, the maximum and minimum values used, or other particular specifications (such as the quantity and type of processors and memory on the modules, the channel bandwidths, the degree of redundancy for any particular component or module, the particular version of an interface standard or component, the number of entries in a buffer), are merely those of the illustrative embodiments, can be expected to track improvements and changes in implementation technology, and should not be construed as limitations.

Functionally equivalent techniques known to those of ordinary skill in the art may be employed instead of those illustrated to implement various components or sub-systems. It is also understood that many design functional aspects may be carried out in either hardware (i.e., generally dedicated circuitry) or software (i.e., via some manner of programmed controller or processor), as a function of implementation dependent design constraints and the technology trends of faster processing (which facilitates migration of functions previously in hardware into software) and higher integration density (which facilitates migration of functions previously in software into hardware). Specific variations may include, but are not limited to: differences in module and chassis partitioning; different module and chassis form factors and configurations; use of different operating systems and other system software; use of different interface standards, network protocols, or communication links; and other variations to be expected when implementing the concepts taught herein in accordance with the unique engineering and business constraints of a particular application.

The embodiments have been illustrated with detail and environmental context well beyond that required for a minimal implementation of many of aspects of the concepts taught. Those of ordinary skill in the art will recognize that variations may omit disclosed components without altering the basic cooperation among the remaining elements. It is thus understood that much of the details disclosed are not required to implement various aspects of the concepts taught. To the extent that the remaining elements are distinguishable from the prior art, components and features that may be so omitted are not limiting on the concepts taught herein.

All such variations in design comprise insubstantial changes over the teachings conveyed by the illustrative embodiments. It is also understood that the concepts taught herein have broad applicability to other computing and networking applications, and are not limited to the particular application or industry of the illustrated embodiments. The invention is thus to be construed as including all possible modifications and variations encompassed within the scope of the claims appended to the issued patent.

What is claimed is:

1. A system including:
   a plurality of compute elements included in a physically-partitionable symmetric multiprocessor, each of the compute elements being a symmetric multiprocessor and having a respective boot resource;
   boot circuitry enabled to:
      direct a portion of the compute elements to initialize coherency link interfaces included therein to isolate all of the compute elements of the portion from each other, disable all but one of the boot resources and enable the one boot resource, and direct all of the compute elements of the portion to fetch instructions;

wherein the compute element having the enabled boot resource programs routing tables associated with the coherency link interfaces to enable shared-memory coherency transactions between the compute elements of the portion;

wherein the compute elements having the disabled boot resources access instructions from the enabled boot resource via the enabled shared-memory coherency transactions in response to the directing to fetch instructions; and wherein the compute elements are capable of communicating inter-process data via a switch fabric.

2. The system of claim 1, wherein all of the coherency link interfaces are compatible with a HyperTransport (HT) link.

3. The system of claim 1, wherein the one boot resource includes a SouthBridge.

4. The system of claim 3, wherein the SouthBridge provides access to Basic Input/Output System (BIOS) instructions.

5. The system of claim 1, wherein the disabling of all but one of the boot resources includes providing a test-mode request to a group of pins of each of the respective all but one of the boot resources, and in response the respective all but one of the boot resources float respective output pins to high-impedance.

6. A method including the steps of:

directing a plurality of compute elements to isolate themselves from each other by disabling included coherent memory link endpoints; then directing a first plurality of the compute elements to aggregate themselves into a first physical partition by enabling the coherent memory link endpoints included in the first plurality of compute elements; then directing the first physical partition to isolate itself by disabling the coherent memory link endpoints included in the first plurality of compute elements that are coupled to a disabled one of the coherent memory link endpoints; then directing a second plurality of the compute elements to aggregate themselves into a second physical partition by enabling the coherent memory link endpoints included in the second plurality of compute elements; then directing the second physical partition to isolate itself by disabling the coherent memory link endpoints included in the second plurality of compute elements that are coupled to a disabled one of the coherent memory link endpoints; and wherein each of the coherent memory link endpoints are arranged in pairs that are operable, when the two endpoints of the pair are enabled, to communicate bidirectional shared memory coherency traffic between the pair of compute elements that include the respective memory link endpoint pair;

wherein the first plurality of compute elements are distinct from the second plurality of compute elements;

wherein the compute elements are included in a plurality of physically partitionable symmetric multiprocessor modules; and wherein the compute elements are symmetric multiprocessors.

7. The method of claim 6, further including after the directing the second physical partition to isolate itself, directing the first plurality of compute elements to isolate themselves from each other by disabling the coherent memory link endpoints included in the first plurality of compute elements.

8. The method of claim 6, further including disabling all but one boot resource of a plurality of boot resources included in the first physical partition and enabling the one boot resource.

9. The method of claim 8, wherein a configuration file identifies one of the first plurality of the compute elements as a boot processor.

10. The method of claim 9, wherein the boot processor is enabled to communicate with the one boot resource via a boot resource interface that is distinct from the coherent memory link endpoints.

11. The method of claim 10, wherein the disabling the all but one boot resource of the boot resources includes directing each of the all but one boot resource of the boot resources to float respective output pins to a high impedance state.

12. The method of claim 8, wherein each of the boot resources includes a respective SouthBridge.

13. The method of claim 6, further including disabling all but one peripheral interface of a plurality of peripheral interfaces included in the first physical partition and enabling the one peripheral interface.

14. The method of claim 6, further including directing the physical partitions to exchange inter-process communication data via a coupled switch fabric.

15. The method of claim 6, wherein all of the coherent memory link endpoints are compatible with a HyperTransport (HT) link.

16. A method including the steps of:

(A) in a first processing element, disabling a first plurality of included ports;

(B) in a second processing element, disabling a second plurality of included ports;

(C) in the first processing element, enabling the first plurality of ports while the second plurality of ports is disabled;

(D) in the first processing element, fetching a first instruction at least in part via one of the first plurality of ports;

(E) in the first processing element, disabling the first plurality of ports after (D);

(F) in the first processing element, enabling the first plurality of ports after (E);

(G) in the second processing element, enabling the second plurality of ports after (E);

(H) in the second processing element, fetching a second instruction at least in part via one of the second plurality of ports and at least in part via one of the first plurality of ports; and wherein the ports are adapted to send and receive shared memory coherency transactions between the processing elements; and wherein the second instruction is provided by memory coupled to the first processing element at least in part via one of the shared memory coherency transactions.

17. The method of claim 16, wherein each of the processing elements is a symmetric multi-processor.

18. The method of claim 16, wherein the first plurality of ports are external ports and the first processing element is a symmetric multi-processor having included internal ports.

19. The method of claim 18, wherein the internal ports and the external ports operate equivalently.

20. The method of claim 18, wherein the processors are enabled to exchange inter-process communication data with each other via a coupled switch fabric.

* * * * *